United States Patent [19]
Walsh et al.

[11] Patent Number: 6,089,456
[45] Date of Patent: Jul. 18, 2000

[54] LOW POWER TELECOMMUNICATION CONTROLLER FOR A HOST COMPUTER SERVER

[75] Inventors: Joseph F. Walsh, Lynnwood, Wash.; David H. Boydston, Goleta, Calif.

[73] Assignee: E-Comm Incorporated, Lynnwood, Wash.

[21] Appl. No.: 08/657,893

[22] Filed: Jun. 7, 1996

Related U.S. Application Data

[63] Continuation-in-part of application No. 08/657,892, Jun. 7, 1996, which is a continuation-in-part of application No. 08/482,261, Jun. 7, 1995, abandoned, and a continuation-in-part of application No. 08/485,083, Jun. 7, 1995, abandoned, and a continuation-in-part of application No. 08/480,614, Jun. 7, 1995, abandoned.

[51] Int. Cl.[7] .................................................. G06K 7/10
[52] U.S. Cl. ........................................................ 235/472.01
[58] Field of Search ..................................... 235/462, 472, 235/470, 469, 463; 361/688, 729, 731, 814; 364/708.1, 709.1; 455/90, 348

[56] References Cited

U.S. PATENT DOCUMENTS

| | | |
|---|---|---|
| 4,471,218 | 9/1984 | Culp . |
| 4,516,016 | 5/1985 | Kodron . |
| 4,569,421 | 2/1986 | Sandstedt . |
| 4,797,920 | 1/1989 | Stein . |
| 4,857,716 | 8/1989 | Gombrich et al. . |
| 4,947,028 | 8/1990 | Gorog . |
| 4,961,220 | 10/1990 | Tentler et al. . |
| 4,978,305 | 12/1990 | Kraft . |
| 4,988,849 | 1/1991 | Sasaki et al. . |
| 5,221,838 | 6/1993 | Gutman et al. . |
| 5,324,922 | 6/1994 | Roberts . |
| 5,340,966 | 8/1994 | Morimoto . |
| 5,365,050 | 11/1994 | Worthington et al. . |
| 5,365,577 | 11/1994 | Davis et al. . |
| 5,410,141 | 4/1995 | Koenck et al. ......................... 235/472 |
| 5,465,291 | 11/1995 | Barrus et al. . |
| 5,468,948 | 11/1995 | Koenck et al. ......................... 235/472 |
| 5,483,052 | 1/1996 | Smith et al. . |

FOREIGN PATENT DOCUMENTS

PCT/US92/03049  10/1992  WIPO .

*Primary Examiner*—Thien Minh Le
*Attorney, Agent, or Firm*—Weiss, Jensen, Ellis & Howard

[57] ABSTRACT

A handheld low power user device for accessing and controlling interactive bidirectional real time telecommunications with a host server over a telecommunication path, the handheld low power user device having a low power sleep mode and components including a communication transceiver, a microprocessor, a power supply interface and an operator interface selected from among a keypad, a bar code reader, an audio system comprising a speaker, a display screen and a microphone; wherein, the communication transceiver includes a low power voice and data modem, and a DTMF or an MF tone generator; the audio system includes a dual power system; the bar code reader includes a bar code media proximity detector; the microprocessor includes less than about 128 Kbytes of PROM, a protected memory, and RAM; the power supply interface is connected with a telephone line, a cellular or wireless telephone battery, or a PBX line; and the handheld low power user device operates on less than about 300 milliwatts of power when off hook (i.e., active).

26 Claims, 11 Drawing Sheets

LOW POWER TELECOMMUNICATION CONTROLLER FOR A HOST COMPUTER SERVER

This application is a continuation-in-part application of U.S. application Ser. No. 08/657,892 filed on Jun. 7, 1996 as a continuation-in-part of U.S. application Ser. No. 08/482,261 now abandoned, Ser. No. 08/485,083 now abandoned and Ser. No. 08/480,614 now abandoned all three applications filed on Jun. 7, 1995 and all three applications incorporated herein by reference.

FIELD OF THE INVENTION

This invention relates to telecommunication devices using a handheld remote computer control wand having bar code reader; audio, voice and visual systems to command a host server.

BACKGROUND OF THE INVENTION

In the emerging Internet era, communications between personal computers (PCs) is becoming routine. While desk and laptop PCs offer telecommunications access to a variety of different server networks, these devices are costly, large, bulky, and require AC power or large rechargeable batteries. PC communication networks are generally one "big party line" that allow eaves-dropping and they are therefore vulnerable to thieves. Ease-dropping enables clever thieves to make clones of legal devices that may be used to access confidential financial accounts and private information. For most business activities public networks need clone detection systems that are infallible. Facsimile communications between PCs are even less secure, and they suffer from other disadvantages in that communication is commonly restricted to textual and/or graphic materials and do not commonly allow voice or audio content particularly if operated at low power settings. Likewise, telephone conversation commonly involves voice without textual or graphic support.

PC's with CD-ROMs offer read-only multimedia capability, but generally the information is not updated on a real-time basis and the content rapidly becomes obsolete. Desktop or laptop PCs are still quite expensive and expensive when compared with the cost and apparent simplicity of a telephone. The standard 101 keys on a keyboard require that the operator know how to type. The PC also requires familiarity with the general features of the computer operating system and user software (including telecommunications software.) In large organizations software upgrades require a significant investment in training. While some in our population are becoming more computer literate, many are not. In use as telecommunications devices, PCs have the following additional disadvantages: namely, being limited to keystrokes and a mouse for input; requiring AC power or rechargeable batteries; and, being bulky and large so that they are not easily carried in a coat pocket or handbag.

U.S. Pat. No. 4,961,220, "Power Management in a Microprocessor-Controlled Battery-Powered Telephone Device", issued Oct. 2, 1990, in the name of Michael L. Tentler et al. and assigned to Spectrum Concepts, Inc., describes a telephone terminal device that is partially powered by a telephone line but using a battery to supply current when telephone line power is inadequate. The terminal includes a microprocessor that is on at all times, and that draws significant current even when the terminal is inactive. Also, the disclosure does not appear to include a means for voice or data communications.

In everyday personal and business life there are many times when it would be highly desirable to have a low power, inexpensive, relatively lightweight, handheld unit that would have the 'touch' and 'feel' of a telephone (or a cordless or cellular telephone), and could transparently establish interactive voice and data telecommunications with a host server in a rapid real-time manner so that the unit transparently acquired the attributes of the large powerful computer.

SUMMARY OF THE INVENTION

The present invention provides a small low power handheld voice and data telecommunications device that communicates with a host server over ordinary telephone lines, cordless telephones and cellular telephones. The device is powered by a telephone line or by batteries in a wireless telephone. The user device has a keypad, bar code reader, audio amplifiers, speaker, microphone and display screen, and communications transceiver (including a bi-directional voice/data modem, multiple frequency tone generator and call progress tone detector); and also includes an optional magnetic bar code reader and codec element. The operator enters messages and commands from the bar code reader or keypad without any user software and can access and command a host to provide multimedia messages in real-time; over ordinary telephone lines, or cordless telephone or cellular telephone radiowave links.

The invention includes a low power voice and data modem that implements a power conservation telecommunications protocol which includes methods for rapid switching between voice and modem data communications using DTMF (or MF) switch signals. The telecommunications protocol enables the user device to perform functions in a sequential manner. Power management by a user device microprocessor assures that only the circuitry that is actively involved in an ongoing task is powered-up. Inactive circuits are placed in a low power "sleep mode", and the major power consuming circuits are normally maintained in this mode. Power management and power conservation telecommunication protocols enable the device to operate on less than about 300 milliwatts of average power (a small fraction of the sum of the power requirements for all the circuits in the device).

The invention includes bar code readers with low power proximity detectors. The bar code reader is kept in a low power sleep mode until a proximity detector identifies a possible bar code media, following which, the reader is powered-up to take a bar code reading. After a successful reading the bar code reader returns to a sleep mode and the microprocessor encodes a modem data packet for transmission to the host server. To avoid a power (and time) intensive modem negotiation, the user device controls the host server using DTMF (or MF) switch signals to simultaneously stop voice communications on the line (i.e., turn voice "off"); turn the modem "on"; set communication parameters (e.g., set baud rate to 1200); and receive data communications. After the data transfer the screen display in the user device is updated and the modem and microprocessor return to sleep mode.

The invention includes a microprocessor with protected memory, authorized access, encryption capability and other security features. Protected memory is useful for storing sensitive information such as account numbers, credit card numbers, ID codes, passwords, mailing addresses, telephone numbers, preferred vendor ID codes, encryption seeds and a session log sequence number. The user device provides the necessary components to perform convenient and secure electronic commerce.

DETAILED DESCRIPTION OF THE PREFERRED EMBODIMENT

Figure 1:
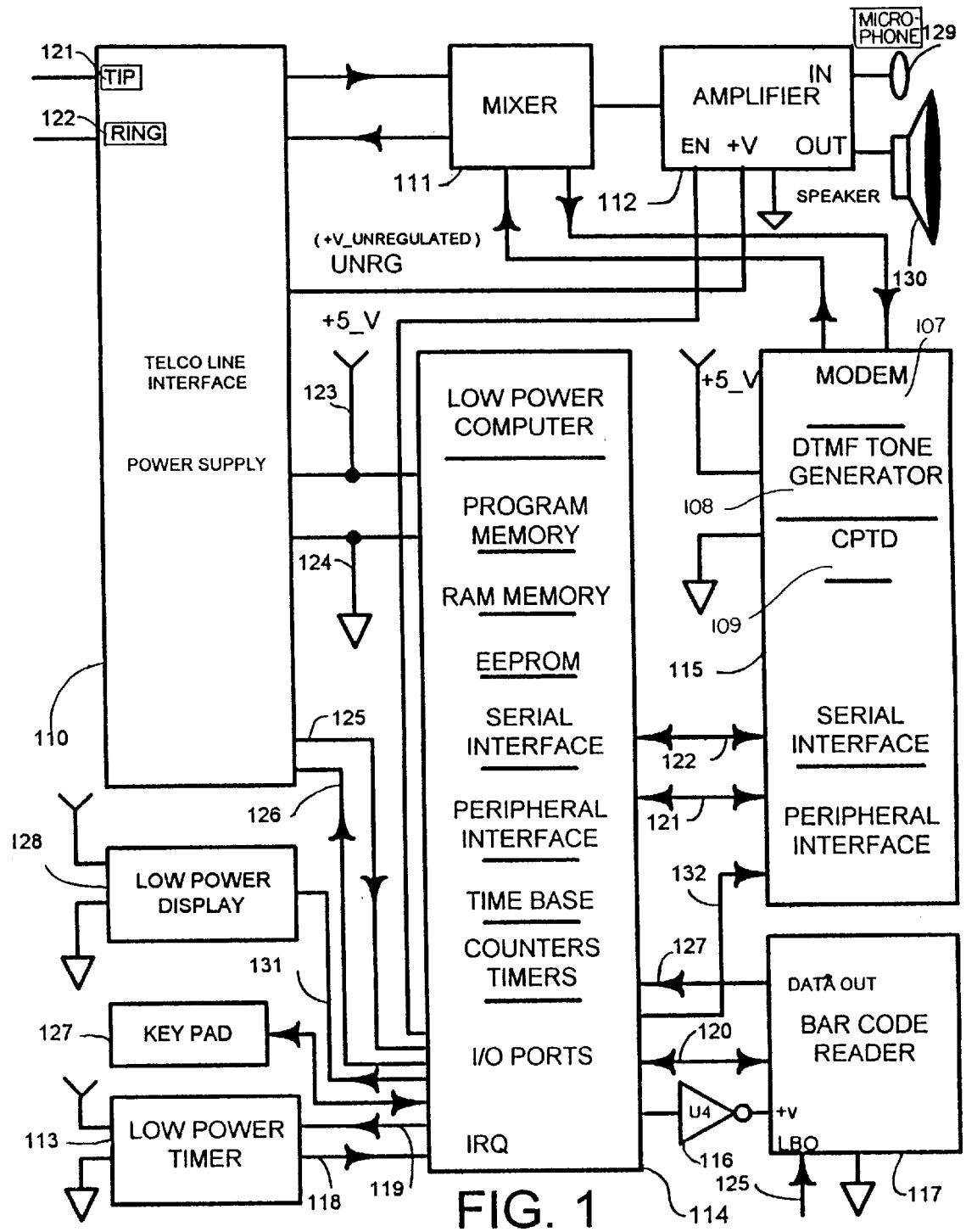
FIG. 1 depicts a block diagram for a low power bar code reader in the subject user device of the invention, according to the disclosure herein, below.

The invention provides a relatively inexpensive, handheld, lightweight low-power user device that enables secure encrypted telecommunications with interactive multimedia content, in real-time, with a central processing unit (CPU) in a host server. (Secure telecommunications methods have been disclosed by one of the inventors in co-pending U.S. Ser. No. 08/480,614, filed Jun. 7, 1995; incorporated herein by reference.) The handheld, low-power user device contains a microphone, audio system with speaker, keypad, display screen (e.g., an alphanumeric or graphic display), bar code reader, magnetic card reader, microprocessor, and communications transceiver; and it draws less than about 300 mw of power e.g. from a telephone wall jack or a wireless telephone battery. The subject device of the invention allow a relatively simple handheld unit having less than about 128 bytes of PROM, 4K bytes of protected memory and 8K bytes of RAM to transparently acquire attributes of a large computer, in this case, the host server CPU.

The user device preferably has all of the following: namely, a bar code reader for generating signals to a microprocessor; a magnetic card reader, for reading secure credit/debit card information into protected memory; a microphone, for transmitting voice messages to the host server; an audio sound system, for presenting audio message from the host server at the user device; a screen display, for displaying data and/or graphic information received from the host server; a microprocessor for encoding command message signals to the host server and for decoding data telecommunications signals from the server; and, a communications transceiver (e.g., a modem coupled with a voice processing element, a DTMF (or MF) tone generator, a call progress tone detector (CPTD) element and an optional codec unit).

The maximal power budget of the low power handheld user device is less than about 300 mw. The transceiver modem and associated circuits for communications, as well as the bar code reader can easily consume all of the budget in the absence of controls. Power management and conservation and communications protocols are thus key in achieving operational capability. Power conservation telecommunications protocols are disclosed by one of the inventors in co-pending U.S. Ser. No. 08/482,261, filed Jun. 7, 1995, incorporated herein by reference. The subject power conservation telecommunication methods allow the user device to control its own power budget by directing the course of telecommunications with the host server. During interactive telecommunications with the host server the only components of the user device that draw current, (i.e., are "active"), are those directly involved in the particular momentary form of telecommunication being received from the host server, i.e., audio system, display screen, bar code reader or data modem. When not involved in a telecommunication session, the user device is powered down to a "sleep" state where current draw is minimized. The power conservation telecommunication protocols according to the invention allow the user device to control the course of communications with the host server and include transmission from the user to the host server of DTMF (or MF) "switch signal" codes. Upon receipt of the DTMF (or MF) signal at the host server any voice messages it may have been playing on line are switched "off" and a modem for data communications is turned "on". Switch signals are capable of switching from voice to data communications in than about 1 seconds, preferably less than about 0.5 seconds, and most preferably less than about 0.1 seconds. The user initiates all modem transfers. The power conservation communications protocol allows the user device to keep its modem in a low power ("sleep") mode until it is needed for data transfer (i.e. the user device does not have to supply power to its modem on a continuous basis looking for possible incoming data.) After the host server receives a command message data packet it may transmit (in response) modem data (e.g. for screen display), and or voice messages.

Embodiments of the invention provide a low power user device for data and voice communication system that derives power from either a telephone loop-line current or a wireless telephone battery. The user device draws power at such a low level that it operates without interfering with voice or data telecommunication systems, e.g., it does not trigger a "wink start" signal or other supervisory telecommunication signal.

An illustrative comparison between the handheld low power user device of the invention and a desktop PC is provided in TABLE A, below.

TABLE A

| Hardware Component | Illustrative PC | Handheld Low Power User Device | Comparison** |
|---|---|---|---|
| RAM | 8–16 Mb | <8 Kb | <0.01% |
| Processor | 32–64 bits 10–14 watts | 8 bits 50 mw | <1% |
| User Software | Assorted | None | None |
| Drive(s) | Hard drive(s) Floppy drive(s) CDROM | None | None |

TABLE A-continued

| Hardware Component | Illustrative PC | Handheld Low Power User Device | Comparison** |
|---|---|---|---|
| Modem | drive(s) 2000–3000 mw | 15–50 mw | <2% |
| Bar Code Reader | External (2–3 amps) | Internal <20 ma | <0.1% |
| Monitor/Screen | 100 watts | <50milliwatts | <0.1% |
| Power Supply | 250 watts | <150milliwatts | <0.1% |

**Comparison User Device Specification/Illustrative Specification × 100%

While the handheld user device contains a relatively simple microcomputer the telecommunications data packets transmitted from the handheld user device to the host server have capability for multimedia content. Likewise, seemingly simple DTMF or MF "switch signals" have power functionality, with one tonal pair capable of instructing the host server to turn-off voice communication, activate modem data telecommunication, set communication parameters (e.g., set baud rate to 1200), and receive data. To further streamline and accelerate the communication process, within a data packet a signal to order an item may for example be followed by an encoded bar code for the product; followed by a second bar coded command to order 'two units of the previous item; followed by a bar coded command to receive voice communication; followed by a voice message, (e.g., 'don't deliver at the backdoor, the dog bites').

Also disclosed by one of the inventors (Ser. No. 08/482,261, supra) are means by which the user device microprocessor compiles and transmits data signals, bar code information and voice communication on a single telecommunication channel by transmitting message packets having embedded command instructions that occasion switching between voice and data.

The user device of the invention finds a variety of uses including many different uses in advertising and sales: for example, ordering consumer products from a host server. Operation of the subject user device does not require that an operator (a) have computer skills; or, (b) learn new software; or, (c) have access to a PC, (or other relatively bulky, expensive presentation equipment, that is inconvenient to carry and use); or, (d) know how to type; or, (e) speak English; or, (f) know how to read a written language. The user device of the invention accomplishes interactive, multimedia, real-time, presentation of audio and visual informational to an operator, e.g. a customer.

As disclosed by one of the inventors (Ser. No. 08/482,261, supra), the instant user device provides means for accessing sound and displaying messages and telecommunication signals from a host server by using bar coded command messages in printed media (e.g. an advertisement). The intricacies of the command structure within the user device are transparent to a user, e.g., no typing or software experience is required. The instant user device has a bar code reader capable of determining proximity of a bar code media and then scanning the bar code. The bar code reader is physically coupled to a telecommunication access channel through a microprocessor and transceiver (i.e. a modem). The telecommunication access channel allows the user device to transmit "command messages" to a host server including those having bar coded commands. According to methods disclosed by one of the inventors (Ser. No. 08/482, 261, supra), the host server responds to a command message from the user device by transmitting "informational messages" to the user device. The latter informational messages have multimedia capability.

In other disclosures by one of the inventors (Ser. No. 08/482,261, supra), the user device of the instant invention provides means for voice and data communications with a host server using a protocol for encoding telecommunication data packets that is both "circuitry" and "protocol". "Circuitry", meaning the hardware in the host server and the hardware in the user device are both capable of rapidly recognizing coded signals embedded in command message data packets and capable of responding by switching between different forms of bi-directional voice or data telecommunications in a manner that is transparent to a user. "Protocol", meaning that the subject method allows the particular hardware operational within the user device at any one point in time to be determined according to need (i.e., audio system, visual display, or bar code reader), and thus, power is only drawn when it is needed. The subject methods assist in enabling a user device that is small, low power and low manufacturing cost while appearing to have the voice, display, memory and computational power of a much larger computer, i.e., the host server.

In yet other methods disclosed by one of the inventors (Ser. No. 08/482,261, supra), power conservation communications protocols contain methods for using a data packet to command switching, i.e., from data back to voice reception using commands in the data packet.

In a first representative example of a power conservation communications protocol method, the user device microprocessor is capable of encoding and transmitting a data packet to a host server that is preceded by a DTMF (or MW) "switch signal" code. "Switch signal" codes allow the instant user device to control voice or data transmissions from the host server. Receipt of the "switch signal" at the host server is capable of instructing the CPU to switch telecommunications signal types, i.e., from voice to data. Switch signals are preferably transmitted immediately before a telecommunication data packet. The subject switch signals are capable of switching between forms of communication in less than about 1 seconds, preferably less than about 0.5 seconds, and most preferably less than about 0.1 seconds. DTMF and MF signals have the advantage that they are distinguishable from voice signals. As disclosed further below, each DTMF (or MF) signal is composed of two frequencies that are not harmonic with each other. These non-harmonic tone pairs do not appear in speech or music. Thus, electronic circuits can detect DTMF (or MF) "switch signal" codes even in the presence of voice or music messages on the line.

Modem communications use FSK, DPSK, QAM and other signaling protocols to encode data. However, the tones used in these data encoding systems also may appear in voice and music. Thus, electronic circuits cannot readily distinguish between modem tones and voice or music messages and modems cannot reliably transmit or receive data when voice or music are on the same communication channel.

Switch signal codes according to the methods of the invention, are important since the host server (and user device) must turn off the modem when voice is being transmitted or the modem would create streams of invalid data commonly referred to as "modem chatter". Similarly, the user device cannot send modem data to the host server if the server is transmitting audio information messages on the telecommunication channel. The instant user device is capable of turning-off audio transmissions from a host server, even while audio is being transmitted on the communication channel. Switch signal codes are capable of interrupting ongoing voice communications and triggering a change from voice to data. The host server CPU has an application running that is programmed to receive and translate the DTMF (or ME) switch signal code as a command instruction executable as one or more of the following: namely, (1) switch voice communications "off"; (2) switch modem communications "on"; (3) set communication parameters (e.g., set baud rate to 1200); and, (4) receive modem telecommunications signals. In the latter case, power and time intensive modem negotiations that can draw significant power and take 10 seconds or more, are reduced to a single power-conserving step requiring less than about 1 second. In addition, power conservation telecommunication protocols according to the invention require that the user device be capable of controlling the course of communications. By directing the course of communications the user device is able to enable only the necessary hardware components, i.e., either voice/audio or modem. In addition, it was considered unacceptable for a user to have to wait for long periods of time for a voice message to finish before a bar code could be entered as a next command. Verifications and acknowledgments from the host server to the user device (during interchange) are displayed on a display screen in the handheld unit. When modem transfers are complete the host server preferably defaults to audio and transmits a voice or sound (e.g., 'five products ordered') message.

Skilled artisans will of course recognize that tonal pairs other than DTMF or MF may be used as "switch signals" according to the methods of the invention, provided that the tonal pairs are not harmonic with each other, and that they are not commonly encountered in voice or music.

Embodiments of the invention provide a simple, fast, handheld user device capable of transparently accessing detailed sound and visual messages by reading printed bar code command messages and signaling instructions for a host server to initiate complex telecommunications providing "informational messages" to the user. The device is relatively inexpensive to manufacture. Uses for the instant device include, reading bar codes in printed media that enable a user device to access audio/visual information over ordinary telephone lines or wireless channels that is designed to enhance the content and quality of the print media. Some representative examples of informational messages, accessible by using the instant user device to read bar codes in a printed media, are as follows: namely, Print advertisements are enhanced by sound, including testimonials for the advertised product, dialogue for actors promoting the product, music and/or songs;

Print advertisements for entertainment products, such as movie or theater tickets, are enhanced by dialogue, theme music, or songs from the advertised show;

Printed "personal" advertisements are enhanced by spoken messages from the person placing the advertisement; and/or News articles and publicity are enhanced by extracts from an interview of the featured person.

The instant user device also is useful for rapidly, simply (i.e., no software to learn), securely and accurately directing command messages to a host server instructing the server to perform pre-programmed tasks, Some representative examples of pre-programmed tasks that may be accomplished using the instant user device are as follows: namely, Price tags, product labels or product catalogs are enhanced by a bar coded command message to initiate an order session to facilitate rapid ordering of a selected product, particularly if the selected product has been ordered previously by the user, e.g. stockroom supplies. According to the present methods, the user device is operated to read and transmit bar coded product label information to a host server in a command message that also may contain keystroke data to indicate the number of items ordered; and, Product labels or product catalogs are enhanced by a bar coded command to initiate pre-programmed clerical tasks, e.g., tasks routinely conducted by a customer or supplier in ordering and/or inventory control; tracking rate of product usage and calculating a time interval for reordering a product; accounting; invoicing; and the like. Representative pre-programmed clerical tasks performed by a customer according to the method of the invention include, but are not limited to: (1) logging the use of the product and its removal from a supply, (2) counting and recording the number of units remaining, (3) selecting and reordering a product, (4) completing a purchase order request, and (5) notifying accounting that an order has been placed.

Representative pre-programmed supplier clerical tasks performed by the instant user device include, but are not limited to: (1) checking availability of an item, (2) updating inventory records, (3) reordering items from suppliers, (4) invoicing the user and charging payment against an account or credit card, and (5) scheduling delivery to the customer's home or business.

Uses of the instant device include reading bar codes and bar-encoded command instructions in product catalogs, on products, or posted in stockrooms, to facilitate ordering of a products.

In a preferred embodiment, the present system provides an account, and the account holder is provided (using the instant user device) with security methods capable of limiting access, and/or restricting purchases initiated from the user device by amount and/or by product category. Some examples of security methods include, but are not limited to: (1) limiting access and/or purchases on a time basis, e.g., to business hours only; (2) restricting purchases initiated from a user device by product category, e.g. to selected types of paper products, hardware, and the like common to the particular inventory; (3) restricting access to require a password or other confirmation, (e.g. a pre-selected bar code password for certain classes of products so that employee's—or children's—access is restricted); or (4) limiting the cost of goods that may be ordered from a particular user device.

In other embodiments the present system provides methods for using a handheld user device to couple bar coded information in a printed media to a host server having dynamic (i.e., changing) product information. Representative examples of dynamic product information include, but are not limited to, information that becomes available only after the print media has been printed and distributed. Some examples of dynamic product information that may be accessed according to the invention are as follows: namely, Airline ticket information accessed using a bar coded command message to instruct a host server to supply the most current aircraft status information, including arrival, departure and gate information, over-booking, and alternative departure information;

Bank statements and credit cards accessed by using a bar coded command to instruct a host server to transmit an audio and/or visual message for displaying at the user device the current balance. Displaying user sensitive account information is more secure than voice because it cannot be overheard. Transmission of the information from the host server to the user device occurs over ordinary telephone lines, or cordless or wireless telephone links, with use of error correcting protocols and an encryption protocol; and, Stock or commodity prices are accessed by using different printed bar coded identifier for each different stock or commodity.

In one embodiment, the instant handheld low power device has a high speed modem capable of transmitting encrypted voice messages to a host server over a telecommunication path, e.g., ordinary telephone lines or a wireless channel.

Embodiments of the invention also provide a low power handheld user device suitable for performing financial transactions with a smart card (as defined below). The handheld user device. of the invention is capable of implementing bi-directional secure telecommunication sessions between a smart card, a financial institution and a vendor having a host server. During the latter session, the operator of the user device may place an order (according to the methods of the invention) with the vendor, the host server may signal the financial institution to debit the smart card, the financial institution may debit the smart card, and the host server may verify the purchase to the operator of the user device. The instant user device is capable of connecting with the smart card and with the host server, and the host server is in-turn capable of connecting with a financial institution maintaining responsibility for the funds in the smart card account. The instant user device contains protected memory and coding and encrypting capabilities that enable a variety of levels of security during the latter session: namely, access to the user device is restricted by identification and authorization codes stored in protected memory; telephone access numbers to the financial institution are also stored in protected memory; bar coding command messages interpretable by the host server can be changed by the host server and user device; modem data signaling insures encoding and error-free transmission; and encrypting digital data for transfer insures additional security. In alternative embodiments, the methods include those in which the user device is used to fulfill the functions of a smart card (supra).

The following terms, as used herein, are intended to having meanings as follows: namely, "Bar code reader" is intended to mean a device for "sensing" (i.e., 'determining proximity of') and reading a bar code, and in response thereto, for generating a digital or analog coded signal representative of those bar codes. Representative coded signals include UPC, AIM, ISO, ANSI, CEN, EAN, ISBT and other related or similarly operative standard codes for identifying products or services;

"Reading", used in regard to the subject methods of the invention, for operating a bar code reader in a user device, is intended to mean the processes of either moving the reader across the subject vertical bar code lines, or alternatively, 'point-and-shoot'/'scanning' operations in which the entire bar code image is determined at one time. "Reading" is further intended, (in its context of intended use herein), to include the steps of capturing reflected light from the bar code, processing the light information to determine bar width and spacing, and generating an analog or digital signal equivalent for the bar code that is transmissible to, and interpretable by, a microprocessor housed within the user device;

"Magnetic card reader" is intended to mean a device capable of reading a code contained on a magnetic strip. Representative examples of magnetic card readers include credit/debit card readers, automatic bank tellers, security card readers and the like;

"User device" is intended to mean a multimedia device capable of transmitting both data packets (optionally encrypted) and voice communications to a host server including all of the following: namely, bar code signals; communications and keystroke encoded signals; and "command message" signals (as defined below). Further, the present "user device" is capable of receiving and displaying "information messages" (as defined below) that are received from a host server which having a content that including one or more of the following: namely, audio; visual; and data signals;

"Handheld" is intended to mean a unit that may be held in one hand at arms length. In a presently preferred embodiment the instant user device occupies a volume of less than about 24 cubic inches and weighs less than about 1 pound;

In referring to directionality of telecommunication according to the embodiments of the invention, a "command message" is intended to mean a telecommunication signal encoded by a microprocessor within a handheld user device that is transmissible to a host server and is capable of instructing the host server initiate the transmission of an "informational message" back to the user device. A command message is made up of instructional command data including one or more of the following, namely, bar code data, keystroke data, and/or a voice message. Representative elements of the user device capable of inputting instructional command data to the subject microprocessor, include a keypad, a microphone, and a bar code reader. "Informational messages" is intended to mean a telecommunication signal encoded at the subject host server and transmissible to a handheld low power user device. Representative command messages from the user device include requests, queries and demands for: lists of available inventory, accounting information, authentication of user ID codes, description of commercial products or service, description of product availability or projected delivery dates, display of order information (e.g. as a FAX message, below), presentation of audio sound messages including e.g., music, nature sounds, product endorsements, and the like, (as disclosed further herein, below);

"Informational message" is intended to mean a telecommunication signal or voice/audio message transmissible from a host server and capable of being displayed and or presented at a handheld "user device", (as disclosed further below). Representative elements of the user device involved in said "display" and "presentation" include (but are not limited to) a display screen (e.g., an alphanumeric or graphics display), capable of presenting text and/or numeric, graphic or pictorial information; and, an audio speaker capable of presenting audio information to the user, comprising e.g. words, tones, music, sound effects, and the like. In optional embodiments the "informational message" may be capable of displaying textual or numeric information to a user in one or more spoken languages. In other optional embodiments the "informational message" may contain data that may be private, confidential or otherwise privileged (e.g., bank records, credit information and business reports), and the display at the user device may be restricted to the display screen;

"Telecommunication" is intended to mean any process that enables one or more users (i.e., persons, or user devices and host servers) to exchange command messages and informational messages over a telecommunications path as digital or analog telecommunication signals decodable into data of any nature and deliverable over any usable medium, e.g., over wire, through air as radiowaves or microwaves (e.g., to satellite), through optical cable as optical signals, or through other media by other means, e.g., electrical or electromagnetic transfer through semi-conductor medium. An individual user access channel within any of the latter telecommunication media being collectively referred to herein as a "telecommunication channel", used interchangeably with "telecommunication path";

"Telecommunication signal" is intended to mean a signal transmissible according to a telecommunication process. Representative telecommunication signals include DTMF (as defined below), MF ("multiple frequency") tones, modem communication signals, multiplexed analog or digital voice communication signals, and the like;

"Data packet" is intended to mean a set of digital telecommunication signals having a beginning in time and an end at a later time, and being transmitted as a continuous unit encoded according to a format pre-determined between the user device and the host server and containing multiple bytes of data being transmitted over a telecommunication path. Representative data packets are disclosed below and contain modem communication signals that may include one or more of the following: namely, encoded keystroke data, encoded bar code data, and voice encoded as an analog or digital telecommunication signal. Command messages are incorpated into data packets for transmission to the host server.

"Telecommunication signal" is intended to mean a signal transmissible according to a telecommunication process, e.g. a signal capable of transmission on a path over channels operative on wire, coaxial cable, optical cable, radiowave, microwave, satellite, and the like. Representative telecommunication signals include DTMF (as defined below), MF ("multiple frequency") tones, data telecommunication signals (i.e., modem signals i.e., FSK, DSK, QAM and the like), analog or voice communication signals including voice encoded into modem signals, and the like. The subject telecommunication signals may be transmitted through telecommunications channels placed within a local area telecommunications network (LAN), e.g., a PBX network, or a wide area network (WAN), e.g., through a local exchange carrier (LEC) to a switching station for transmission to a distant LEC;

"Cellular" is intended to mean a telephone connection to a wireless telecommunication system using cellular telephone techniques or radio telephone techniques, including those systems using macrocells, microcells, and satellites;

"DTMF", is used herein as an acronym for dual-tone multiple frequency (i.e., "touch tone") communication signals, i.e., the generic name for the tone signaling format used to signal from telephones to switching equipment and involving 10-integer digits and two auxiliary characters represented by selecting one frequency from a low frequency group (i.e., 697 Hz, 770 Hz, 852 Hz, and 941 Hz) and one frequency from a high frequency group (i.e., 1209 Hz, 1336 Hz, and 1447 Hz.);

"DTMF" frequency groups used in public telephone networks are as follows: namely, for "1", 1200 Hz and 697 Hz; for "2" or "ABC", 1336 Hz and 697 Hz; for "3" and "DEF", 1477 Hz and 697 Hz; for "4" and "GHI", 1200 Hz and 770 Hz; for "5" and "JKL", 1336 Hz and 770 Hz; for "6" and "MNO", 1477 Hz and 770 Hz; for "7" and "PRS" 1200 Hz and 852 Hz; for "8" and "TUV", 1336 Hz and 852 Hz; for "9" and "WXY", 1477 Hz and 852 Hz; for "*", 1200 Hz and 941 Hz; for "0" and "Operator", 1336Hz and 941 Hz; and, for "#", 1477Hz and 941 Hz;

The "CPT" (Call in Process Tones) are "used in telephone networks to indicate line status, and are as follow: namely, for a "busy signal", 480 Hz and 620 Hz at a cycle of 0.5 seconds on and 0.5 seconds off; for a "call progress signal", 440 Hz and 480 Hz; for a "ringing signal" 20 Hz; for a "dial tone" 350 Hz and 440 Hz. User interfaces with telecommunication signaling systems are subjects in "General Recommendations on Telephone Switching aid Signaling" (International Consultative Committee for Telegraph and Telephone; CCITT) and "K-Series Modem Design Manual" (Silicon Systems Inc., 14351 Myford Road, Tustin, Calif. 92680). The acronym "CPTD" is intended to mean call progress tone detector;

"MF", is used herein as an acronym for "multiple frequencies" and is used to refer to two or more simultaneous tones such as commonly used for interoffice telephone exchange address signaling and including 10 digits and 5 auxiliary signals, wherein each is selected from two of the following: namely, 700 Hz, 900 Hz, 1100 Hz, 1300 Hz, 1500 Hz and 1700 Hz;

"Transceiver" is used herein interchangeably with "communications transceiver" and "wireless transceiver" and is intended to mean all the user device hardware necessary to transmit to, and receive analog and/or digital telecommunication signals from, the host server. A representative transceiver includes (but is not limited to) a modem (below); digital voice processing and transmissions element (e.g., a codec); a DTMF and/or an MF tone generator; a CPTD; and, connecting circuits from those units to the microprocessor; and, connections from those units to a telecommunication path. (If voice is transmitted in modem communication packets a codec device is included to convert modem signals to analog voice.)

"Modem" is intended to mean a device capable of both: (i) encoding, i.e., for transmission on the communication medium, signals received from a computer CPU or microprocessor into a signal suitable for transmission by a telecommunication process (e.g., FSK, DPSK, QAM codes and the like); and (ii) decoding from a communication medium signals suitable for the host server CPU or the instant user device microprocessor.

"Codec device" is used herein as a contraction of coder/decoder to refer to a telecommunications voice processing device capable of encoding analog voice into digital signals for digital signal transmission in a telecommunication network to a host server; and for decoding digital signals received from that host server back to analog voice.

"Microprocessor" as used herein with regard to user device 100 is intended to mean a computer microprocessor chip (or chips) preferably having less than about 128 Kbytes of PROM; and, having less than about 8 Kbytes of RAM, preferably less than 1,000 bytes, and most preferably about 512 bytes to about RAM. In a first representative embodiment (disclosed further below), the modem and the subject microprocessor are separate chips. In a second representative embodiment, the modem and microprocessor may be housed within a single chip. For example, a digital signal processing chip (DSP) has the capacity to simulate a modem, send DTMF signals and detect CPT. Certain DSP chips also have a microprocessor with sufficient RAM and PROM that they are capable of performing the functions of the instant user device including: decoding bar code signals, encrypting and decrypting data, displaying data, communicating voice and data to a host server, and executing the power management and power conservation communications protocols of the instant invention. (Motorola Inc. manufactures and sells a "DSP56L800" series of DSP chips, certain of which have capabilities useful in the instant user device.) Assembling the instant user device with such DSP chips is considered to fall within the scope and spirit of the invention;

"Bar code microprocessor", where so identified, is intended to mean hardware distinct from microprocessor 114, that is directly coupled by circuitry to the bar code reader and functionally performs the task of determining the integers/numbers and/or characters encoded on the bar code for transmission to microprocessor 114. In one representative example (disclosed further below), a CCD bar code microprocessor contains a pulse timer capable of periodically awakening the bar code reader from a "sleep mode" (defined below) to check for the proximity of a bar code medium;

"Code" is intended to mean a set of unambiguous rules specifying the way in which digital (binary) characters are presented. ASCII is a representative example of a code used in computer systems for specifying alpha-numeric characters. Representative examples of codes used for confirming media integrity of data packets include checksum and CRC codes;

"Encode" is intended to mean the process of converting bits of digital information into signals for transmission on a communication media;

"Multimedia presentation" is intended to mean an audio/visual transmission from the host server to the user device capable of displaying visual data, graphics and the like on the screen display; and sound at the audio system coupled to a speaker In an alternative embodiment, a multimedia presentation includes a facsimile document transmitted from the host server to a FAX machine at the location of the user device;

"Real Time" when used in the context of describing the process according to the invention, is intended to mean that the subject process takes place while the user is in telecommunication with the host server, i.e., the subject process may involve pre-programmed information but the audio or textual output to a user device is changeable and is generated dynamically. Representative examples of "real time" processes include sending display or voice responses to the user device in response to command messages from the user device; all occurring while an operator waits for the display or voice response. In a preferred embodiment the response time is short and the operator does not notice the waiting time. A first representative example of a "real time" operation is provided by the steps of: (1) an operator pushes a button on the keypad of the handheld low power user device; and, (2) in response, the operator receives a voice or screen display from the host server in less than about 1 to 2 seconds. If the response time is less than about 1 to about 2 seconds the user will tend to ignore the delay. A second representative example of a "real time" operation is provided by the steps of (1) an operator directs the bar code reader in the handheld low power user device to scan a bar code; and, (2) the operator hears a voice response in less than about 1–2 seconds, i.e., while the operator waits.

"Soft key" is intended to mean a keypad key in the subject user device that may be assigned a function by an application running in the host server, e.g., "send more product information", or "cancel the last item from the order". The functionality of a "soft key" can be changed at the host server allowing for upgrades and changes without modification of the instant user device. All the keys on the user device keypad have capability of being designated as a "soft key". The "ON/OFF" key of the user device also function as a soft key, but in a different way. Namely, the "ON/OFF" key has the fixed function of turning the instant user device "off" and "off" as well as a "soft key" function associated with a programmable access telephone number (i.e., in user device PROM) for contacting a host server;

"Smart card" is intended to mean a machine-readable device with one or more computer chips capable of retaining and storing data in non-volatile memory (NOVRAM) that is capable of changing the data stored therein in response to commands issued from a host server. Representative examples of "smart cards" include credit/debit cards When used in regard to the instant invention, the term is intended to mean both a physical device that can be used with the instant device to accomplish financial transactions, as well as, functions accomplished by the instant device that emulating those which can be accomplished by using a "smart card". For example, account-holder information in the NOVRAM of a "smart card" (or the instant user device) may include certain account numbers, names, addresses, balances, ID codes or other pertinent information useful in financial transactions. A "smart card" (and the instant user device) may be used to make purchases and be updated at a point of sale (POS) terminal. "Smart cards" (and the instant user device) can be used like cash to accomplish purchases of consumer goods. A user deposits money in a financial institution and the smart card (or instant user device) is updated accordingly. As a user makes purchases, the balance in memory of the smart card (or user device) is updated, both electronically and in real time. If a smart card is lost or stolen, the financial institution is notified and it will no longer validate withdrawals from the card. If a user device is lost or stolen access to the host server and accounts is not authorized. Smart cards (and the instant user device) can also provide medical records information;

The acronym "PROM" is intended to mean programmable read only memory;

"Host server" is intended to mean a computer at a site having a telecommunication path to the instant user device. While it is not required that the host server and user device be located in different building, this may commonly be the case in many modes of use. In all case, the subject user device is not directly connected by wire, cable or means other than through a telecommunication channel to the host server, or to any personal computer (PC);

"Operator" is intended to mean a human being controlling a handheld low power user device according to the invention;

"Off hook" is intended to mean that the subject user device is "active", i.e., on-line and/or engaged in transfer of telecommunication signals with a host server;

"On hook" is intended to mean that the subject user device is "inactive", i.e., not engaged in transfer of telecommunications signals with a host server;

"Sleep" mode is used to indicate that current to the subject hardware component is reduced to a low level of activity such that it is drawing only a minimum amount of current from the power supply. In a representative example, the communication transceiver (i.e., modem) is in "sleep" mode when the only function being performed is monitoring for a signal (e.g., from the microprocessor or from the host server), i.e., the transceiver is in "sleep mode" when it is not transmitting or receiving signals from a host server;

"Dormant" mode is used in a manner similar to "sleep mode" (above) but to indicate that a lower level of current (i.e., less than about 0.01 ma) being drawn from the power supply (e.g., as when the user device is "on hook"). In one representative example, the bar code reader is maintained in a dormant state when not in use and only powered up when it is needed to take a bar code reading;

"Idle" is used to mean that the instant user device is not sending or receiving telecommunications signals and is not reading a bar code; and, "Switch signal" is intended to mean a DTMF or MF signal that precedes a command message data packet transmitted from the subject user device; that, when received at a host server is interpretable by the application running in the CPU as an instruction to switch from a voice to a data communication mode; or alternatively, to switch voice transmission "off" (e.g., to call a "time-out"), or to switch voice or data transmission "on", (e.g., to resume a transmission); or, to change communication parameters (e.g., to set a lower baud rate.) In a preferred embodiment, a single DTMF or MF switch signal is interpreted by the subject application running in the CPU as more than one command instruction. In a first representative example, and presently preferred embodiment, a switch signal is a single DTMF (or MF) signal that instructs the host server to: (i) turn voice communications "off", (ii) turn data communications "on", (iii) set communication parameters (e.g., set baud rate to 1200), and (iv) receive data signals. In a second representative example of a switch signal a single DTMF (or MF) signal that instructs the host server to: (i) turn audio telecommunications "off"; (ii) power status at the user device is low so hold all outgoing messages until a "resume" signal is received; (iii) maintain the session log as "in progress" until a resume signal or cancel signal is received.

The following disclosure details a presently preferred embodiment of the invention as described with regard to preferred functions and hardware components. Those skilled in the art will recognize, after reading the application, that embodiments of the invention may be implemented by certain hardware substitutions that achieve equivalent functions without requiring undue experimentation.

The present invention is useful in the methods, processes and systems disclosed in the inventor's co-pending U.S. application Ser. Nos. 08/482,261 and 08/480,614 application serial numbers, both applications filed on Jun. 7, 1995, and both applications incorporated herein by reference.

The component numbering system (identified in bold type) that is used throughout the accompanying disclosure is as follows: namely, the first integer refers to the FIGURE number; the second and third integers refer to the component part number. For example, number 120 makes reference to a user device, that is part number 20 in FIG. 1.

General Features of the User Device

The user device is designed to require very low power so that it can be powered by the currents available in an ordinary telephone loop-line or in a cellular telephone battery. In general, when "dormant" (i.e., the telecommunication transceiver is "on-hook") the user device requires less than 0.01 milliamps (mA) current; when "active" (i.e., transceiver "off-hook") it requires about 5 mA current if the bar code reader is idle; and, when the bar code reader is active and the transceiver is off-hook, the device requires no more than about 300 mw of power. The user device may draw less than 300 mw of power when coupled to a PABX or PBX system having lower levels of available power (e.g., less than 150 milliwatts). User device circuitry is also protected from high voltage spikes that may occur in a telephone line. To conserve cellular telephone batteries, in these applications the subject user device preferably draws less than about 5 ma of power when idle (i.e., not involved in sending or receiving signals.)

Telephone-Powered User Device

FIG. 1 depicts a block diagram for a low power bar code reader in the subject user device of the invention.

A user device 100 includes: (i) a telephone line interface 110, for accessing current and telecommunication signals in a telephone line, (ii) a microprocessor 114 coupled to telephone line interface 110, for controlling the user device 100; (iii) a low power timer circuit 113, for regulating current supplied to microprocessor 114; (iv) a bar code reader 117, for measuring reflected light from bar codes and for generating bar code signals; (v) a communication transceiver element 115, for encoding outgoing telecommunication signals to be transmitted on the telephone line and for decoding incoming telecommunication signals received from the telephone line; (vi) a microphone 129, for sending voice messages to a host server; (vii) a key pad 128, for entering optional keystroke data; (viii) a screen display 119, e.g., an LCD display, for presenting visual, data, and/or graphic information to the operator; (ix) an audio mixer 111 coupled to communications transceiver element 115 and to audio amplifier 112, which is in-turn, coupled to speaker 130, for presenting messages received over the telephone line e.g., synthetic and recorded speech, music, tones, nature sounds and the like.

Telephone line access interface 110 is coupled to telephone line 120 through a tip node 121 and a ring n-ode 122. Telephone line interface 110 supplies audio and data telecommunication signals, as well as regulated power at a logical high voltage node 123 and a logical low voltage node 124. The power supply power status output is provided at node 125, and control of power output is provided at node 126.

A logical high voltage node 123 and logical low voltage node 124 are coupled. to microprocessor 114. Microprocessor 114 includes: (i) a processor element; (ii) programmed read only memory (PROM); (iii) random access data memory (RAM, including nonvolatile protected memory); (iv) serial and peripheral communication-link (com-link) interfaces, for connecting to communication transceiver 115; (v) a wakeup/sleep timer ("time base"; "counters"; "timers", FIG. 1); (vi) input/output ports, for connecting to bar code reader 117; and, (vii) signal interface ("IRQ", FIG. 1), for receiving, i.e., interrupt signals, and sending signals from low power timer 113.

A representative example, and presently preferred embodiment, of a microprocessor 114 useful in the subject user device 110 is manufactured and sold as "MC68HC11E20" by Motorola, Inc., of Phoenix, Ariz. Substitution of the subject microprocessor with other microprocessors is possible within the scope of hardware components, functions and limitations set forth in the instant disclosure.

Microprocessor 114 measures and controls current drawn from telephone line 120 by receiving power supply status output measurements at node 125, and sending power supply control signals into interface 110 at node 126. The input signals from node 125 are coupled through microprocessor 114 and the IRQ signal interface to low power timer 113. Timer 113 is a low power clock designed to periodically awaken sleeping microprocessor 114 by transmitting interrupt signals at preselected intervals i.e., at "IRQ" (FIG. 1).

A representative example, and presently preferred embodiment, of a low power timer 113 useful in user device 110 is manufactured and sold as the "74HC4538" product by Motorola Corporation of Phoenix, Ariz. Substitution of the subject low power timer with other power interrupt circuits is possible within the scope of hardware components, functions and limitations set forth in the instant disclosure.

Logical high voltage node 123 and logical low voltage node 124 supply power to bar code reader 117 through inverter 116. Bar code reader 117 emits one or more narrow band light beams toward a bar code, measures the distance between reflected peaks of light, and generates a bar code signal at node 127 that is sent to microprocessor 114.

A representative example, and presently preferred embodiment, of an inverter 116 useful in user device 110 is manufactured and sold as the "74HC04" product by Motorola Corporation of Phoenix, Ariz. Substitution of the subject inverter with other inverters is possible within the scope of hardware components, functions and limitations set forth in the instant disclosure.

Logical high voltage node 123 and logical low voltage node 124 also supply power to communication transceiver element 115. Communication transceiver element 115 includes: (i) a modem, (ii) a DTMF (or MF) tone generator, (iii) a call process tone detector (CPTD) element, (iv) an optional voice processing element; and (v) serial and peripheral interfaces, for coupling incoming and outgoing telecommunications signals to microprocessor 114. Telecommunication transceiver element 115 transmits as data packets the encoded and/or encrypted command messages received from microprocessor 114 with media integrity checksum and/or CRC type codes. The latter data packets received from microprocessor 114 include keystroke, bar code data and/or digital voice; and the packets are transmitted as telecommunications signals over telephone line 120 to a host server. Command message data packets may be preceded by DTMF (or MF) switch signals (as disclosed, supra.) Transceiver element 115 also receives incoming telecommunications signals that make up the information messages transmitted from the host server. Transceiver element 115 identifies and separates along different paths call process tones (i.e., in the CPTD element); audio communications, for output to the audio system through audio mixer 111; and, data telecommunications (e.g., modem) signals, i.e. for media integrity error checking, decoding, and output as digital data to microprocessor 114.

In a first representative example, and presently preferred embodiment, a modem useful in communication transceiver 115 is manufactured and sold as the "MC 145444" modem product by Motorola Corporation of Hong Kong. Preferably, the crystal in the MC 145444 is set to about 3.58 MHz.

In a second representative example, and presently alternatively preferred embodiment, a modem useful in communication transceiver 115 is manufactured and sold as the "SSI 73K322L" single chip modem transceiver product, by Silicon Systems, Inc., of Tustin, Calif. The SSI 73K322L chip requires more support circuitry than the MC145444, and the necessary circuits are disclosed below (i.e., FIGS. 7–9). Substitution of the subject modems by other modem/transceiver units is possible within the scope of hardware components, functions and limitations set forth in the instant disclosure.

The telephone line interface 110 couples outgoing telecommunication signals including data telecommunications (i.e., from modem 107), DTMF or MF signals (i.e., from DTMF tone generator 108) and audio signals (i.e., from microphone 129) to telephone line 120 (FIG. 1). Incoming data telecommunications signals, or call progress signals, received at interface 110 are routed e.g., through convenient contact points on audio mixer 111 (FIG. 1) respectively to modem 107, and CPTD element 109, both located in communication transceiver 115. Incoming audio telecommunication signals are routed directly into audio mixer 111 that is in-turn coupled to the other elements of the audio system, namely, amplifier 112 and speaker 130. Outgoing audio telecommunication signals from microphone 129 may be routed through amplifier 112 into mixer 111 and into line interface 110 for transmission to a host server on telephone line 120.

Many representative examples of microphone 129 are useful in communication transceiver 115 including most standard telephone microphones, but preferably those that do not require biasing.

In a preferred embodiment, telephone line interface 110, mixer 111, amplifier 112, microphone 129, speaker 130, low power timer 113, microprocessor 114, communication transceiver element 115, and bar code reader 117, operate together in the systems, power management and power conservation telecommunications methods that are further disclosed in the inventor's incorporated patent application disclosures (supra).

An operator of user device 100 may operate bar code reader 117 to direct narrow light beams toward bar codes thereby to generate a bar code signal from bar code reader 117 to microprocessor 114. In a first representative example, bar code reader 117 is operated by 'dragging' it across the subject bar code to generate the bar code signal. In a second representative example, (and presently preferred embodiment), the subject bar code reader 117 is of a low-power 'point-and-shoot'/'scanning' design (disclosed below) which illuminates an entire bar code at one time, stores the reflected light from the bar code in a photosensitive array, and then generates an entire bar code signal, i.e. at 'one shot'.

The microprocessor 114 packages, encodes and optionally encrypts one or more bar code signals into a command messages for transmission by transceiver 115 on telephone line 110 to a host server Telecommunication transceiver element 115 encodes the command message as data packets, preceded by optional DTMF (or MF) switch signal codes, for transmission on the telephone line 110 using, respectively, the modem and the DTMF (or MF) tone generator. The node at audio mixer 111 couples the switch signals and command message data packet telecommunication signals to telephone line 110 for transmission to the host server. The host server compiles, encodes and transmits informational messages as telecommunication signals on telephone line 120 to telephone line interface 110, where the signals are coupled to the node at audio mixer 111. The audio mixer 111 couples the audio informational message directly into the audio system, i.e., amplifier 112 coupled to speaker 130 for audio (e.g., voice, music, nature sounds, etc.) presentation at user device 100.

Telecommunications Channel Interface Module

Figure 2:
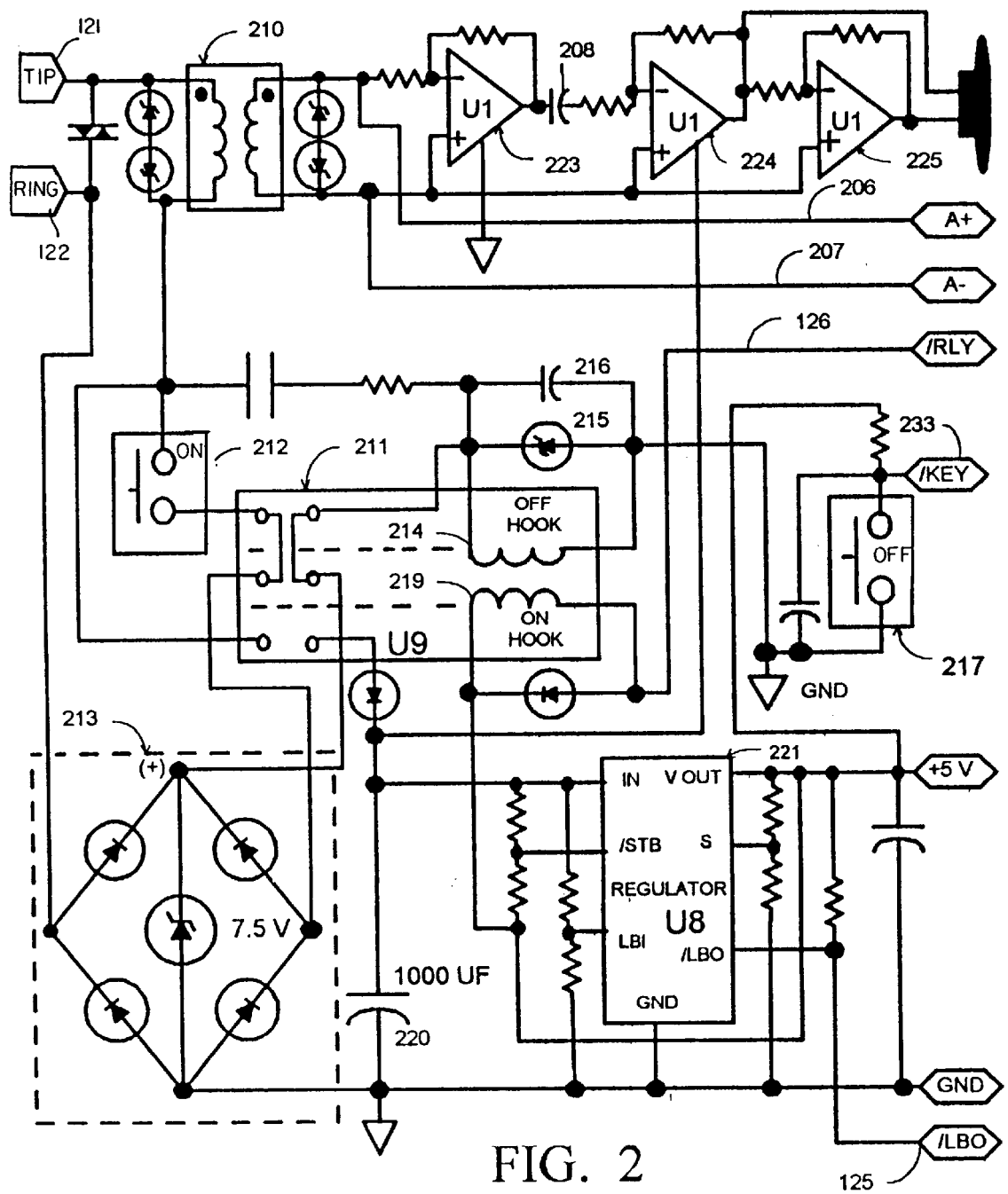
FIG. 2 depicts a circuit diagram for a telephone line interface and power supply module useful in the instant user device, as disclosed herein below.

FIG. 2 depicts a circuit diagram for a representative telephone line interface and power supply module useful in the instant user device.

Interface 110 (FIG. 1) couples incoming and outgoing telecommunication signals and audio between telephone line 120 and communications transceiver 115. Interface 110 also provides power for user device 100 by accessing telephone loop line current.

Telephone line 120 has tip node 121 and the ring node 122 and a loop line current, (i.e., in line 120), that is coupled to transformer 210 within interface 110 (FIG. 1). Transformer 210 powers one or more dual mode audio amplifiers 223, (e.g., a pre-amp and one or more amplifiers as depicted in FIG. 2). In this context "dual mode" is intended to mean that the subject amplifier has both a low power idle (sleep mode) and a higher power (active mode) capability with the trip switch between the two different modes being determined by the input current to the amplifier. Current output to audio mixer 111 (FIG. 1) is available at connectors 206/207

(A⁺/A⁻, FIG. 2). Transformer 210 also powers a regulated power supply for microprocessor 114. (In alternative embodiments, a solid state circuit may replace relay 211, e.g., circuit 1710 disclosed below in regard to FIG. 17.)

The power supply provides power to user device 100 and either draws enough power to signal to a central office (e.g., and LEC) that the user device 100 is "off hook" (i.e., active); or alternatively, opens the telephone line to signal that the user device is "on hook" (i.e., inactive). Relay 211 is a latching double pole, double throw switch. The relay is switched by momentary pulses on coil 214 or coil 219. FIG. 2 depicts user device 100 "on hook", not drawing current from the tip 121 and ring 122 nodes of telephone line 120, and with all circuitry in user device 100 in "sleep mode". When an operator pushes button 212 current is connected from tip node 121 to the "AC 1" input of diode bridge 213. The positive output of diode bridge 213 is directed to the "off hook" coil 214 of relay 211. As a result, relay 211 changes state from sending current to coil 214 to providing current to diode 218, capacitor 220 and voltage regulator 221. Voltage regulator 221 supplies power to microprocessor 114, and in the foregoing scenario, awakens microprocessor 114, i.e., from "sleep mode" to initiate processing. Diode bridge 213 directs positive current to capacitor 220 and power supply 221 irrespective of the polarity at the tip 121 and ring 122 nodes. A high signal on /LBO 125 (low battery out) indicates that capacitor 220 is charged and ready to supply current. In power management methods of the invention, microprocessor 114 checks the status of power at /LBO 125 before starting any tasks that may require a significant amount of current (e.g., greater than about 3–5 ma). A pulse on /RLY 232 to coil 219 turns the user device 100 off In other embodiments, power may be turned off by an operator at keypad "OFF" button 217 or by a pulse on /RLY 126 from microprocessor 114. In an alternative, and presently preferred, power-down embodiment, keypad "OFF" button 217 sends a logic signal to microprocessor 114. In response, microprocessor 114 terminates the session with the host server, initiates a maintenance session (i.e., to update session logs), and then sends a pulse on /RLY 216 to coil 219 that powers-down user device 100.

In a presently preferred embodiment, amplifier circuit 112 (FIG. 1) includes two or more dual mode amplifier elements 223, 224, 225 (FIG. 2), each amplifier element having a set of resistors, (i.e., to set voltage gain and determine the input signal level that switches the amplifier from a low power "sleep mode" to a higher power "active" mode); and, the two amplifier elements are separated by capacitor 208, (i.e., to provide an audio system with both a pre-amp and an amplifier.) Audio amplifier circuits 224 and 225 are coupled to speaker 130. Amplifiers 224 and 225 drive speaker 130 with differential signals, in that, both carry the same audio signals but with opposite polarities. One amplifier drives the speaker high while the other drives it low, i.e., effectively doubling he amplitude of the audio signal driving speaker 130.

Signal input to amplifier 112 is controlled by audio mixer 111, i.e., across nodes 206/207 (FIG. 2). With NO input on telephone line 120, amplifier 112 enters a low power idle state; when there is audio signal from mixer 111, amplifier 112 enters a higher power state (i.e., the "dual power mode", supra). Thus, amplifier 112 saves power and provides for a low power user device 100 by only entering the high power state when it is receiving incoming audio communication signals from mixer 111 or when it is receiving outgoing audio signals for transmission from microphone 129. The latter high and low power states constitute a power management method according to the methods of the invention.

Transformer 210 (within interface 110, FIG. 1) is coupled to the regulated power supply module (i.e., bridge 213, capacitor 220, and power regulator 221) through relay 211 under the control of "ON" 212 and "OFF" switches 217. As an overview, "ON" 212 switch and "OFF" 217 switch control relay 211 and determine "off hook" (active) or "on hook" (inactive) status, respectively (as disclosed, supra). Closing the contacts in the "ON" switch 212 allows current to flow from transformer 210 through relay 211 inducing current in circuits that provide a regulated power of about +5-volts to microprocessor 114. Closing the contacts in the "OFF" switch 217 sends current to coil 219 which opens relay 211 (supra). Opening relay 211 turns off any current from tip node 211 that might otherwise flow into the regulated power supply circuits. "OFF" switch 217 is useful for taking user device 100 to the "on hook" (i.e., inactive) state.

Describing current flow, when switch 212 is in the "ON" position (i.e., coupled) current flows from transformer 210 through switch 212 and relay 211 into diode bridge 213. Current flows out of diode bridge 213 (i.e., at "+" FIG. 2) into relay 211 and then into "off-hook" coil 214. A zener diode 215 is coupled across off-hook coil 214 to protect it from voltage spikes, surges and the like. The current flowing through the off-hook coil 214 switches relay 211 into a "coupled/off-hook" state (i.e., "active") and current is allowed to flow from transformer 210: (i) into capacitor 220; and (ii) power regulator 221. The net current flow in the "off-hook" state is to make a regulated power supply of about +5V available to microprocessor 114 through regulator 221. In contrast, relay 211 is "decoupled" into an "on-hook state" (i.e., "inactive") by grounding a power supply control input signal at the node 126, i.e., current flow across on-hook coil 219 setting relay 211 to the "on hook" (inactive) position. When the relay 211 is in the "on hook" state, transformer 210 is decoupled from the regulator 221 and capacitor 220, and power output and charging of the capacitor both cease.

A voltage potential difference across capacitor 220 provides a temporary source of input voltage to regulator 221. Regulator 221 adjusts to varying input voltage and provides a regulated output voltage of about 5-volts, i.e., across nodes 123 and 124 ("+5 V" and "GND", FIG. 2), to microprocessor 114, transceiver 115 and other circuits in user device 100. Capacitor 220 provides a short-term current storage. Input current to capacitor 220 may vary with activity on telephone line 120, (e.g., The loop line current varies with audio signals on the line. The higher the audio signal the less current available.) Capacitor 220 charges rapidly when there are no audio signals on the line (i.e., a quiet line). The load on capacitor 220 varies with demands of the different active hardware components within user device 100. In selecting a regulator for use in the instant invention, it is important that regulator 221 not draw an excessive amount of current when the input voltage is low, in this case, to prevent regulator 221 from improperly discharging capacitor 220. A representative example of a regulator useful in the instant invention is disclosed below.

Describing next logical controls that operate to control output from the regulated power supply. Power supply status output information is available in regulator 221 i.e., at terminal "low battery out" ("/LBO", FIG. 2), with output coupled to node 125 for access by microprocessor 114. When power supply is low a logical "/LBO" status output to microprocessor 114 indicates the condition and microprocessor 114 is programmed in PROM to power-down until the /LBO status output ends. In a preferred power management embodiment, microprocessor 114 is programmed to check the /LBO status at the node 125 before instructing any operation that may require a significant amount of power (e.g., more than 3–5 ma), e.g., before encoding and transmitting an outgoing command message.

Microprocessor 114 provides power management for the instant low power user device 100 by monitoring /LBO output at node 125, and by managing and controlling the power requirements of the user device so that power is supplied to hardware components within the user device only when it is needed and only when it is available. Power consumption by the dual power mode amplifier 224/225 (supra) is also under the control of microprocessor 114. Since the dual power amplifier 224/225 is normally maintained in a low power "sleep mode" it only goes to a higher power when transmitting or receiving audio signals, and that is under the control of microprocessor 114. Microprocessor also controls the power supply for the audio amplifier circuits.

In one preferred embodiment, a PROM location in microprocessor 114 contains instructions for encoding a command data packet preceded by a DTMF "switch signal". For example, when user device 100 encounters a low power state during a telecommunication session with a host server and is receiving an incoming voice information message, if sufficient power remains microprocessor 114 may send a switch signal at the beginning of a command message data packet instructing the host server to refrain from sending voice messages for a preselected (or indefinite) amount of time, e.g. until a "resume" switch signal is transmitted. In another example, an operator desires to stop audio output from the host server and is preparing to transmit a command message data packet (e.g. containing bar code data) but power may be at a premium, so a switch signal is transmitted to the host server at the beginning of the command message. The latter switch signal instructs e.g.: (i) turn off audio transmission, (ii) turn off voice reception, (iii) turn on data communications, (iv) set communications parameters (e.g., set baud rate to 600), (v) receive data communications (i.e., the encoded bar code data in the command data packet).

Commonly, user device 100 transmits "switch signals" (e.g., DTMF or MF signals), modem data signals, (or other communication signals) to a host server when the user device 100 is not receiving (or transmitting) audio, i.e. during a pause. Thus, telecommunications are interactional and "bidirectional" but not simultaneous in time.

When the user activates "OFF" switch 217, a logic signal is transmitted to microprocessor 114. Microprocessor 114 responds by ending the session and taking telecommunications, i.e., "on-hook". Thereafter, microprocessor 114 performs maintenance tasks such as updating the session records stored in PROM (i.e., methods further disclosed in the inventor's incorporated patent application disclosures, supra).

In a presently preferred embodiment, microprocessor 114 uses the power supply control input at node 126 to send one or more logic signals to on-hook coil 219/1719 to power down user device 100.

In a representative example, and presently preferred embodiment, amplifier 112 is manufactured and sold as the "MC33304P" product by Motorola, Inc. of Phoenix, Ariz.

In a representative example, and presently preferred embodiment, speaker 130 is manufactured and sold under a variety of different brand names as a standard 2-inch diameter 25-ohm speaker, although speakers of other diameters of and resistance values will also, in general, be acceptable.

In a first representative example, and preferred embodiment, relay 211 is manufactured and sold as the "RLY5140D" product by Philips ECG of Williamsport, Pa.

In a second representative example, and presently alternatively preferred embodiment, relay 211 is a solid state relay manufactured by AT&T Corporation of Allentown, Pa. Although the AT&T relay is more compact, it generally requires a steady state current (i.e., about 2 mA) to keep the relay in an "on" state. This leaves 2 mA less current available for other circuits in user device 100, (including the audio system circuits). Skilled artisans will recognize that the choice between metallic relays (Phillips, supra) and solid state relays (AT&T, supra) is application dependent, but use of either relay type is considered to be within the scope and spirit of the invention. In certain cases either choice is acceptable; metallic relays have the advantage when the user device is coupled to the public telephone system where user equipment is subject to relatively high voltage signals. Mechanical relays also provide greater isolation from telephone lines. FCC regulations require that on-hook current be limited to less than about 10 nanoamps (nA). However, there are no such regulations as to maximum on-hook current draw when connected to PBX systems commonly found in business offices.

In a representative example, and presently preferred embodiment, regulator 221 is manufactured and sold as the "Max 883" product by Maxim Corporation of Sunnyvale, Calif., and includes an FET coupled between its input and output nodes.

Telephone-Powered User Device

Figure 3:
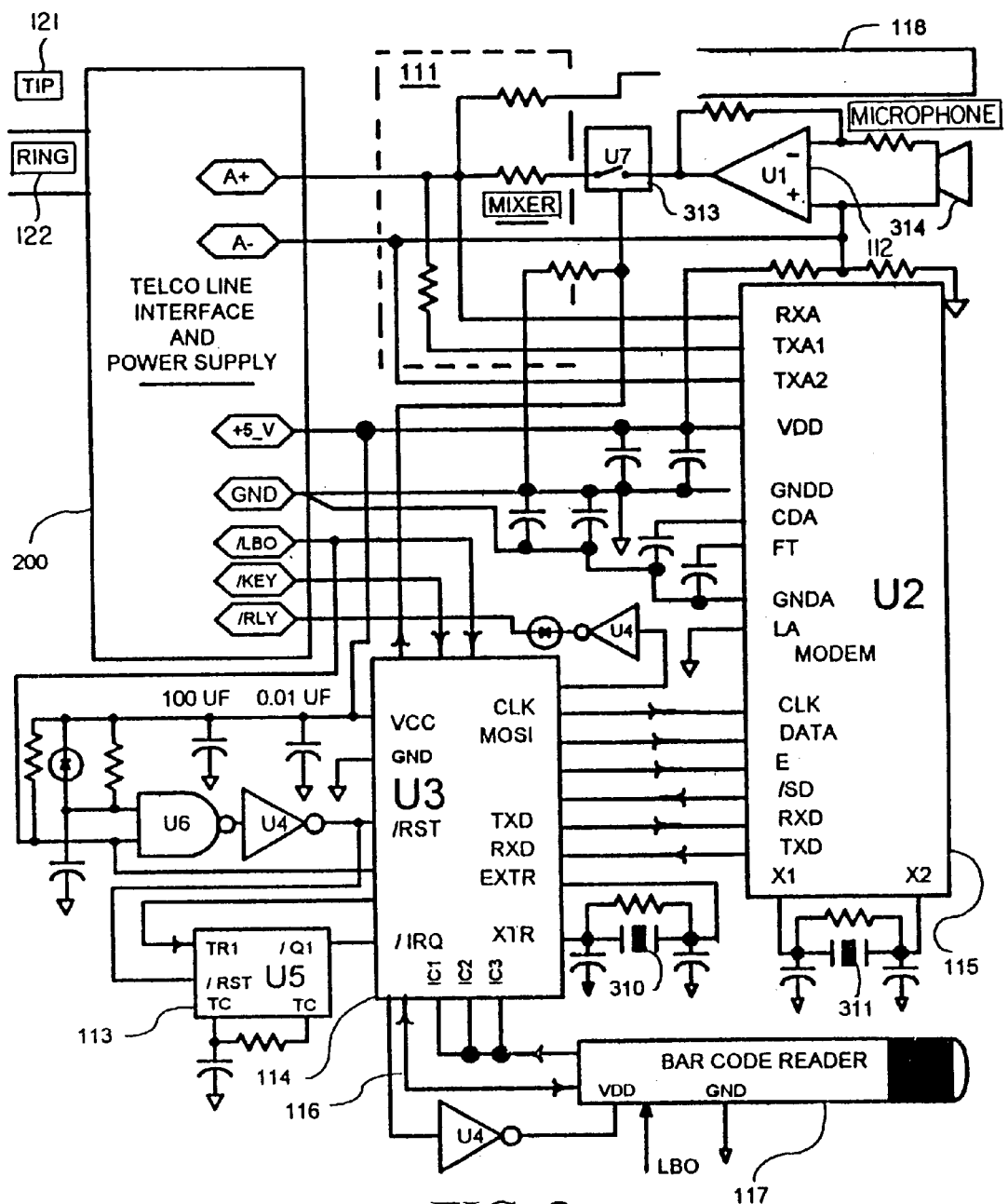
FIG. 3 depicts a circuit diagram for a low power user device.

FIG. 3 depicts a circuit diagram for a low power user device.

In a preferred embodiment, bar code reader 117 includes a bar code reader and/or scanning device, but without an associated bar code microprocessor. Reflected narrow band light from bar codes is measured, and a voltage or digital bar code signal representing the width and spacing of the bars in the code is coupled to microprocessor 114. An application program running within microprocessor 114 PROM determine the characters encoded by the subject code bar code and digitize, encodes, and optionally encrypts the data for transmission. In an alternative preferred embodiment, bar code reader 117 is of a "point and shoot/scanner design", (as disclosed, supra). The latter scanner incorporates a bar code reader microprocessor and proximity detector.

In a first representative, embodiment bar code reader 117 is a "return to black state" type bar code reader; i.e., the output bar code signal from the reader changes when reflected light from a target generates a signal change in the reader state to "white" (active). The latter bar code reader design "changed state" acts as a proximity detector that "senses" contact with a possible bar code media and signals for the bar code reader circuitry to take a reading. In the "black state" the bar code circuitry is consuming little power (i.e., a low power sleep mode.) When integrated into the user device of the invention the bar code reader is connected with (and under the control of) microprocessor 114. Microprocessor 114 is periodically awakened by timer 113, and after awakening it tests the bar code circuit to determine whether a change in "state" has occurred, i.e., from a "black state" to a "white". If no change of state has occurred, the microprocessor 114 returns to its low power sleep mode. If a change of state has occurred, microprocessor 114 enables the bar code reader and takes a reading.

It is preferred that the bar codes to be read (or scanned) have a light (preferably white) background and dark (preferably black) bars although reflective background colors and non-reflective bar colors are also anticipated.

Power management methods of the invention include maintaining bar code reader 117 in a low power ("domnant")

mode when not in use, (i.e., drawing low or no power); and maintaining microprocessor 114 in a low power "sleep" mode when not in use.

In a second representative embodiment, bar code reader 117 is of a CCD "scanning" type design (below) and periodically, low power timer 113 (FIG. 1) periodically triggers an interrupt signal for microprocessor 114, that causes it to draw current, leave sleep mode and enter an awake state. Upon waking, microprocessor 114 causes power to be supplied to bar code reader 117, the reader sends out a narrow band light beam from a proximity detector (below) to identify any possible targets If reflected light is not detected, power is shut off and bar code reader 117 once again resumes a "dormant" mode. If the bar code reader 117 resumes a "dormant" mode, microprocessor 114 receives a representative signal thereof, and it powers down into a "sleep" mode. Alternatively, if bar code reader 117 detects reflected light the bar code microprocessor associated with the proximity detector sends a "Start Decode" signal to microprocessor 114. The "Start Decode" output is interpreted by the program running in the microprocessor 114 PROM as: (i) remain awake; and (ii) proceed to process successive bar code signals into characters until reading by bar code reader 117 is complete.

In a representative example, and presently preferred embodiment, timer 113 uses very little power and is of a one-shot design (e.g., a monostable multivibrator), or similar circuit design that can trigger microprocessor 114 by raising an interrupt signal at a selected time, i.e., preferably at about 0.1 second intervals, but in alternative embodiments any other functional time period may be selected. Preferably, timer 113 draws less power than an internal timer (or time base) present in microprocessor 114. (For example, internal timers such as a crystal-based timers or ceramic resonators generally consume about 1 milliamp (mA) of current per 1 MHz of microprocessor clock speed.)

In an alternative embodiment, microprocessor 114 may have its speed adjusted to provide a faster bar code reader, while preserving the low power aspects of the user device.

In a preferred embodiment, the bar code may include an AIM standard bar code, an ISO standard bar code, an ANSI standard bar code, a CEN standard bar code, an EAN standard bar code, an ISBT standard bar code, a UPC standard bar code, or another bar code.

User Device Coupled to a Cellular Telephone

Figure 4:
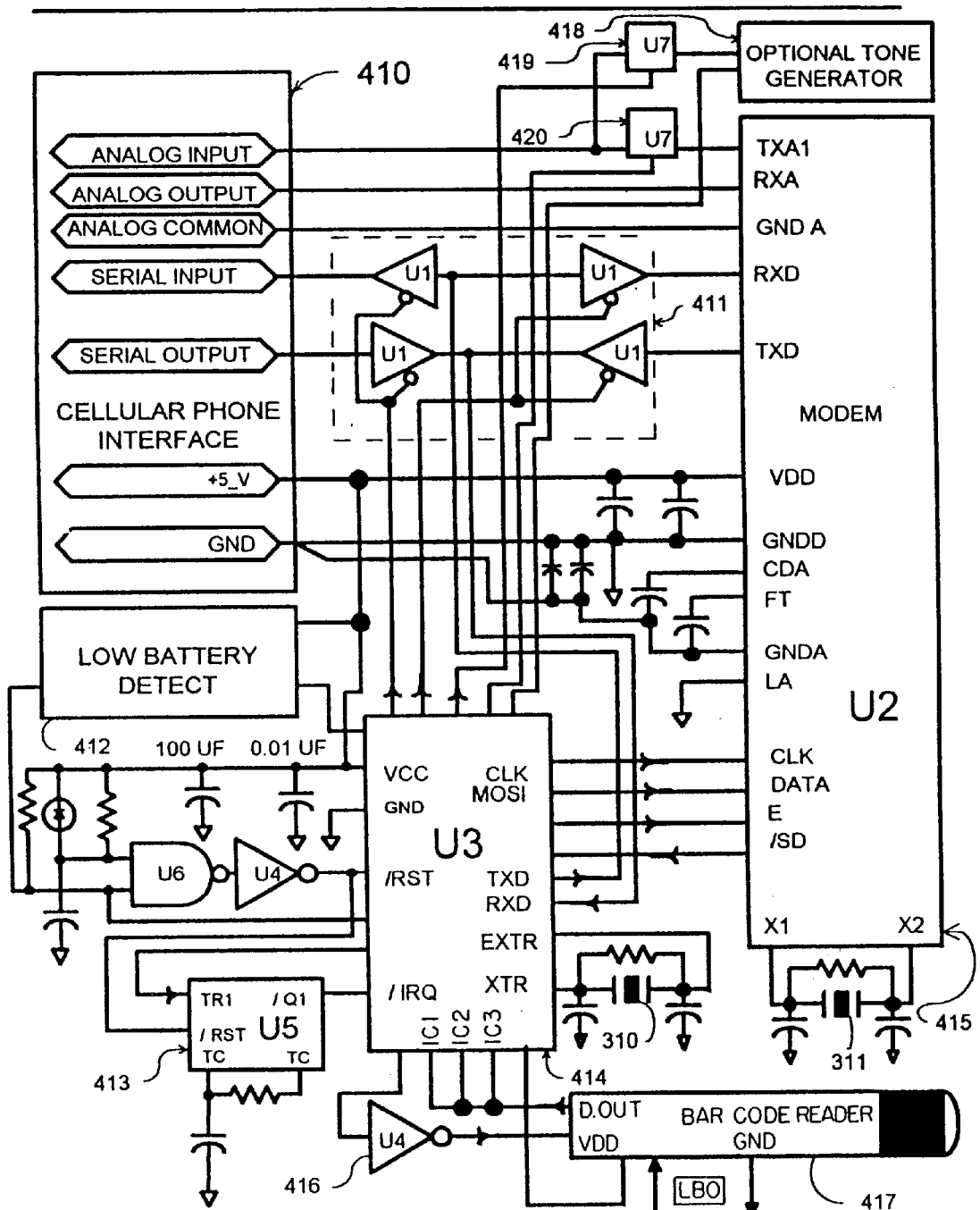
FIG. 4 depicts a circuit diagram for a handheld low power user device having a cellular telephone adapter.

FIG. 4 depicts a circuit diagram for a low power user device and cellular telephone adapter.

Cellular telephone interface 410 includes an analog and serial interface to a cellular telephone. In a preferred embodiment, the particular interface selected depends on the telephone to which the interface must be coupled.

Certain cellular telephone manufacturers provide direct codec interfaces into telecommunication channels, while others provide interfaces through radiowave modem transceivers; collectively these respective different telecommunications interfaces are referred to herein as "wireless transceivers". When subject user device is connected to a wireless telephone having a radiowave modem, then the need for a separate modem (i.e., in the user device) may be obviated. When the wireless telephone has a codec unit (i.e., for analog to digital inter-conversion) that is connected through a radiowave modem to a telecommunication path, then the subject user device has a modem connected to the codec unit. In either application, a key factor is the algorithm used to compress the particular radio modem data. Skilled artisans will recognize that certain compression algorithms designed for voice transmissions will distort modem signals.

Other compression algorithms designed to remove background noise (i.e., repetitive signals) can confuse modem signals with background noise and therefor remove a host modem signal. Certain wireless telephones allow direct access to a radiowave modem. In three representative, and presently preferred embodiments, wireless telephones manufactured by: Ericsson G.E. (Research Triangle Park, N.C.), provides a cellular telephone with a codec interface, i.e., an analog interface; Qualcomm, Inc. (San Diego, Calif.), provides wireless transceivers used for both analog and digital cordless telephones; and, Zilog Inc. (Campbell, Calif.), provides wireless transceivers (wireless modems) useful with both analog and digital cordless telephones, with the digital model providing a direct access to a wireless modem.

Thus, the user device of the invention is not intended to be limited to applications involving a single handheld low-power user device configured for only one particular telecommunications use. Wireless uses are presently most preferred because connecting a user device directly connected to a wireless modem transmits data at faster rates.

In operation the low power user device of the invention, connected to a cordless cellular telephone, is powered-down when not in use. In a first embodiment, low power timer 413 periodically transmits an interrupt "wake-up" signal to microprocessor 414, which responds by powering up microprocessor 114 and testing the signal from the bar code reader 417, i.e. to check for a proximity signal (i.e., reflected light "white" state signal, supra). If the bar code signal from the bar code reader 417 is "black", indicating no target, microprocessor 414 powers-down the user device. If the bar code signal from the bar code reader 417 is "white", indicating a target, then microprocessor 414 processes the bar code data.

Figure 6:
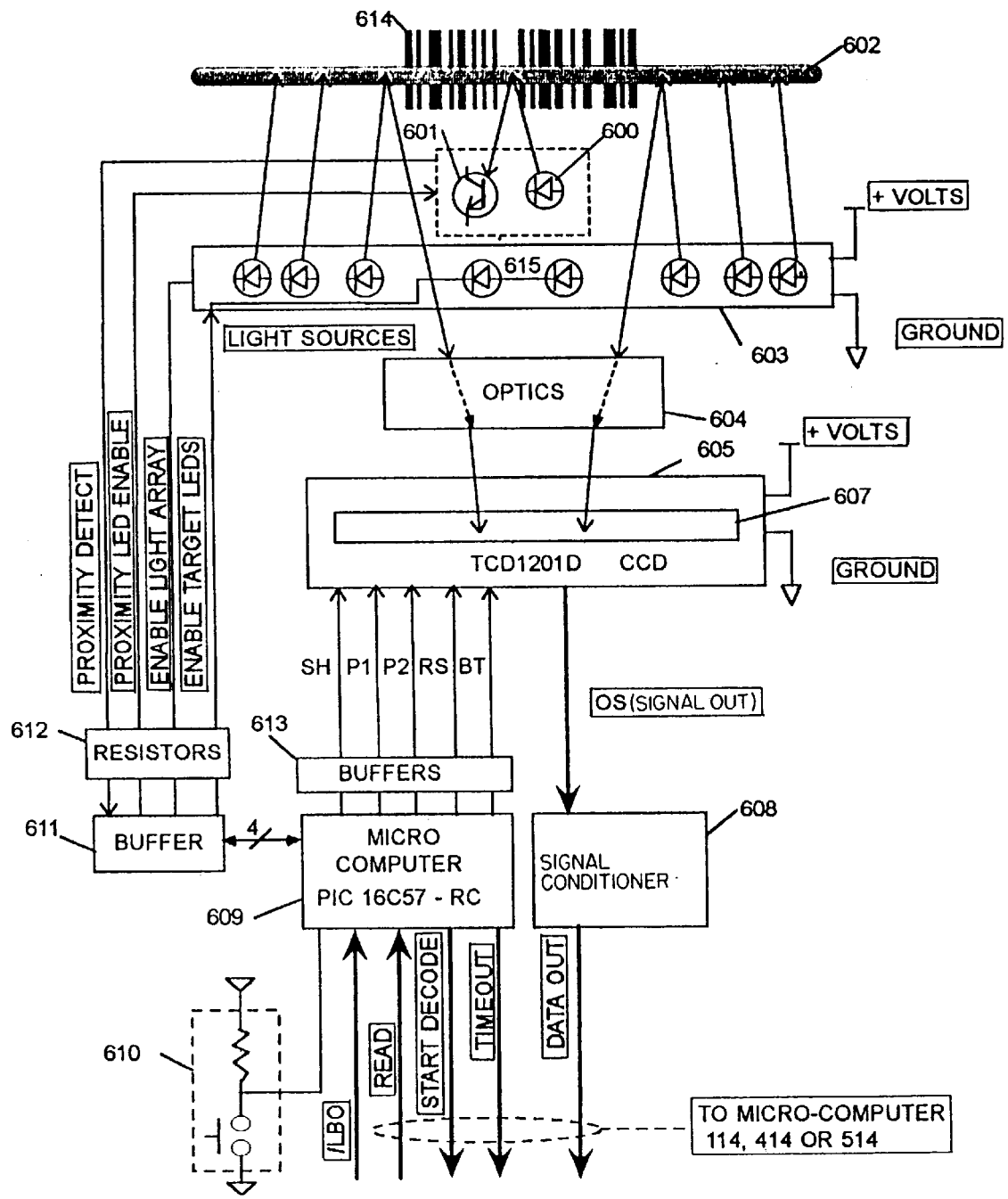
FIG. 6A depicts schematically a CCD type bar code reader with a proximity detector in a handheld user device according to the instant disclosure (below).
FIG. 6B depicts a CCD bar code reader signal conditioner for converting analog signals from a bar code reader to digital signals for input to a microprocessor according to the instant disclosure (below).

In a second alternative embodiment (i.e., for user devices equipped with a CCD type scanner), proximity detector 620 (FIG. 6) detects a bar code media and sends a "Start Decode" (supra) signal to microprocessor 114. The Start Decode signal instructs the microprocessor 114 to: (i) remain awake, and (ii) process the bar code signal from the scanner.

In a third alternative embodiment, switch 212 is provided for powering-up user device 100. (A user device may of course be supplied with both switch 212 and the automatic system, supra.) The cellular telephone interface 410 in the user device of the invention has power management systems (supra) for conserving and minimizing power drawn from batteries. Power conservation telecommunications protocol methods (supra) enable microprocessor 414 to control transmission to, and from, a host server by encoding command messages and switch signal codes (supra). Communications transceiver. element includes modem 415 and DTMF tone generator 418 (or other communication tone generator). In one particular embodiment a modem may be selected for use that is capable of transmitting DTMF (or MF) tones. Switch 411 optionally couples communication transceiver 415 to cellular telephone interface 410 when the adapter is oil, otherwise, the cellular telephone battery may power bar code reader 417.

Alternatively, the host cellular telephone microprocessor 414 may be programmed and/or modified to accomplish the telecommunication tasks of microprocessor 414, or, a microprocessor chosen specifically for its compatibility with the objects of the present invention may be incorporated into a wireless telephone. In either of the latter embodiments, the aim is to provide a microprocessor that manages a low power consumption by the component hardware of the instant user device by implementing: (i) power management methods (supra); and (ii) power conservation telecommunication methods (supra.) The subject microprocessor is the "master" in controlling telecommunications with the host server; and, managing power requirements by shutting off power to different hardware components when they are not in use or needed for an incoming informational message. Switch 411 optionally couples (and uncouples) communication transceiver element, e.g., modem 415, to cellular telephone interface 410 when the adapter is powered on; otherwise, the cellular telephone itself may power the bar code reader 417.

Microprocessor 414 and/or transceiver element 415 may operate in conjunction with call processing circuitry resident in a cellular telephone. For example, cellular telephones are commonly able to generate and transmit DTMF tones, and sometimes with good power efficiency. Similarly, cellular telephones are commonly capable of detecting and interpreting call progress tones, again, sometimes with good power efficiency. In alternative embodiments, objects of the invention may be accomplishing by modifying hardware and programming resident within a wireless telephone to accomplish the power management (supra) and power conservation telecommunications protocol (supra) functions achieved by the subject user device of the instant invention.

User Device Coupled to a Wireless Telephone

Figure 5:
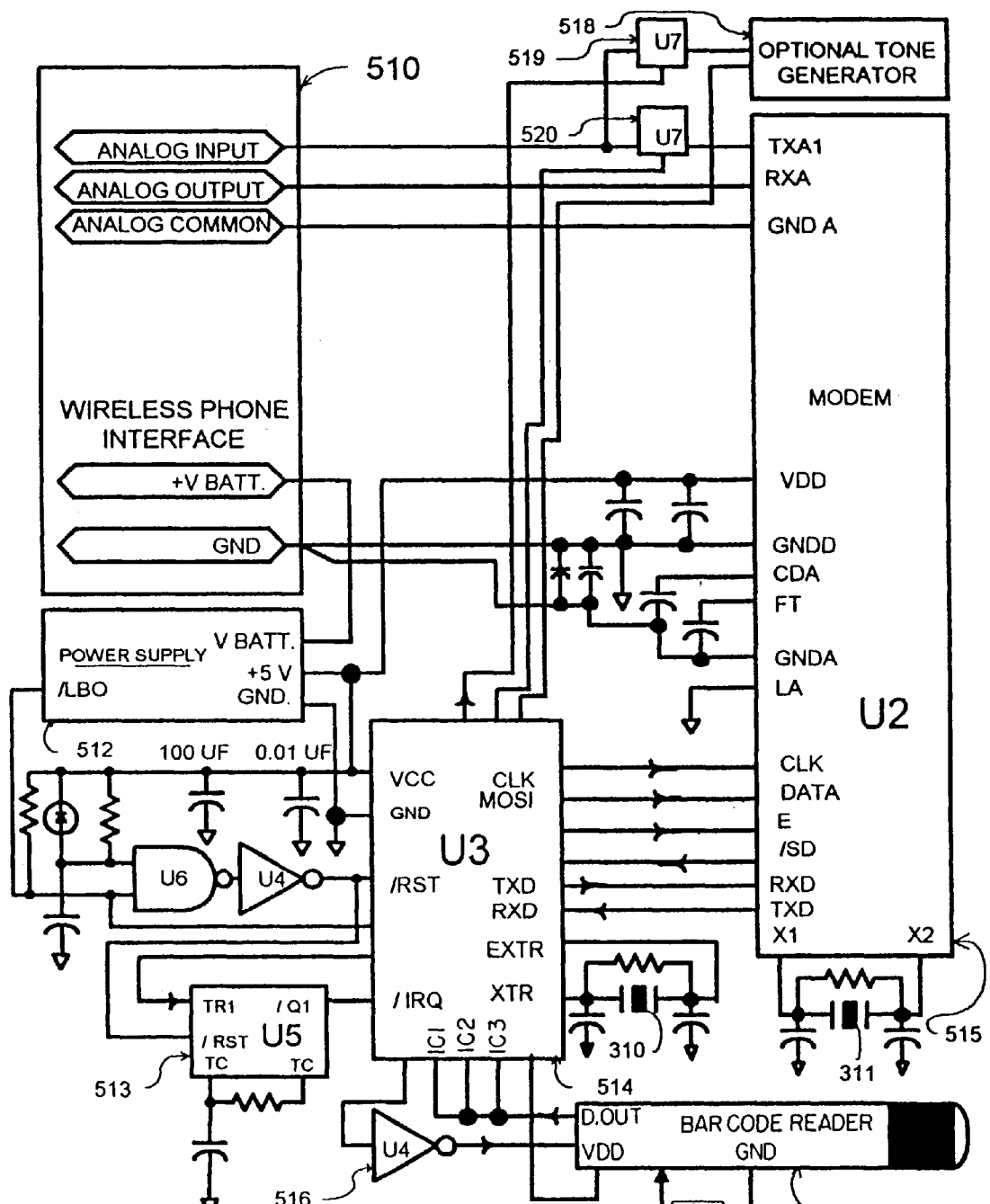
FIG. 5 depicts a circuit diagram for a handheld low power user device and wireless telephone adapter.

FIG. 5 depicts a circuit diagram for a low power user device and wireless telephone adapter (e.g. a cordless phone).

As described in the incorporated disclosures, the user device may include a cordless radiowave communication path to a wireless transceiver, that in-turn couples the user device to the host server. (The functions of the hardware components depicted in FIG. 4 are parallel with those of like-named components disclosed in regard to FIG. 3, above.) Wireless telephone interface 510 includes an adapter to a wireless telephone 500, i.e., in a manner similar to that disclosed above for cellular telephone interface 410.

Wireless telephone interface 510 supplies power to microprocessor 514, which is periodically awakened by a low power timer 513. Microprocessor 514 has power management and power conservation telecommunication protocols and is connected with (and responsive to signals from) bar code reader 517. When microprocessor 514 is awakened, it powers-up bar code reader 517 and determines if the bar code reader is generating a signal, e.g., a "while state" signal or "Start Decode" signal, supra.

If bar code reader 517 is not identifying a target (e.g., a bar code media), then microprocessor 514 resets the low power timer 513 and powers-down to a dormant (low power) mode. If the bar code reader identifies proximity of a target bar code media, then microprocessor 514: (i) remains awake; and (ii) processes the bar code signal (supra).

Microprocessor 514 has power management and power conservation telecommunication protocols and controls communications transmitted to and received from the host server. Transceiver element has modem 515 and DTMF (or MF) tone generator 518 (or other communication tone generator). Microprocessor 514 couples the communication transceiver to the wireless telephone interface 510 using switch 519 and switch 520. In an alternative embodiment in user devices equipped with a CCD bar code reader, a proximity detector 620 detects a target and the scanner sends a "Start Decode" signal to microprocessor 514 instructing: (i) remain awake; and, (ii) decode CCD scanner bar code data.

CCD Bar Code Scanner

FIG. 6A depicts schematically a CCD type bar code scanner.

CCD-type bar code scanners are commonly easy to use. The user simply points the scanner at a bar code and it emits a flood of light that helps the user target the bar code. Most common CCD scanner take continuous readings until a complete signal for a bar code is achieved. A "beep" is output when a valid reading has been achieved. The scanner commonly floods the bar code with light and the space between the bar codes reflects light while the bars are not reflective.

Common CCD scanners draw too much current for use in the user device of the instant invention, even when they are equipped with a manual trigger to help conserve power. The user pulls a trigger only when ready to take a reading, but still the CCD continuously floods the object with light and takes readings until a valid bar code signature is obtained. This process commonly draws more current than is available from telephone lines or cellular phone batteries.

CCD scanners normally turn on all the lights in a light source to help the user target the bar code. This feature results in power consumption that is too exorbitant draws too much current for use with in the user device of the invention. Most of the time the CCD scanner may be trying to take a reading when it is too far away from the bar code media to get a valid reading. Embodiments of the invention solves this problem by using a proximity detector, target lights and low power indicator circuits in a CCD-type scanner.

A representative example of a CCD-type scanner that may be modified for use in the embodiments of the invention is a CCD chip with a window having an interior array of photo sensors. Light reflected from the bar code enters the chip's window and the CCD scanner captures a digital signature of the reflected signal from the bar code. A separate bar code microprocessor (i.e., independent from the user device microprocessor 114, 414, 514) processes the digital bar code signature to decode the integers encoded in the bar code.

Proximity detector light 600 emits a narrow light beam (e.g., one or more LED lights) in the direction of bar code media 614. If bar code media 614 is within target range, photo sensor 601 detects the reflected light from focal axis 602 and a "proximity detect" signal is sent to bar code microprocessor 609. Bar code microprocessor 609 turns on CCD light source 603 to flood bar code media 614 with light on focal axis 602. Optics 604 focus the reflected light into window 607 of CCD chip 605. Bar code microprocessor 609 uses clock signals SH, P1, P2, RS and BT to take a reading with CCD chip 605. CCD chip 605 outputs an analog image of the bar—code on media 614 on OS(Signal Out). The analog signal is converted to a digital signal by signal conditioner 608. "Data Out" signals from the signal conditioner 608 are transmitted to the user device microprocessor 114 (or, 214, 314, 414, 514) for processing. "Start Decode" from bar code microprocessor 609 instructs the user device microprocessor 114 to start decoding the "Data Out" signal.

In various aspects, the embodiments of the invention control one or more different target lights 615 (e.g., LEDs) separately from the other lights in CCD light source 603. In one embodiment useful in user device 100 (i.e, telephone line-powered), bar code microprocessor 609 controls one or more target lights 615 to strobe the light. The target lights 615 partially illuminate focal axis 602, helping the operator to aim the scanner at the bar code on media 614. Target lights 615 draw much less current than the complete CCD light source 603. The complete CCD light source 603 is only turned on when Proximity Detector 601 and the bar code microprocessor 609 identify the proximity of bar code media 614. In a presently preferred embodiment, the duty cycle and number of target lights 615 is adjusted to draw less than 10 milliamps for telephone powered applications (i.e., user device 100). In certain cellular telephone and/or other battery powered applications (i.e., user devices 100, 200, 300, 400 or 500) bar code microprocessor 609 may utilize a trigger switch 610 that is depressed by an operator to turn on target lights 615.

Power management protocols according to the embodiments of the invention include a first method in which bar code microprocessor 609 (and/or the main user device microprocessor 114) use "/LBO" input from the power supply to check the available status of the power supply before supplying current to target lights 615 or CCD light 603. Bar code microprocessor 609 may also optionally check status of trigger switch 610 before turning on lights and taking a reading (i.e., "user present?").

In a second power management method of the invention, bar code microprocessor 609 has its own low power sleep mode with its own internal timer 620. The internal timer is programmed to wake up only the bar code microprocessor 609 (not the main microprocessor 114) several times per second. (Bar code microprocessor 609 requires less power than microprocessor 114.) When awakened, bar code microprocessor 609 supplies current to the proximity detector 616 and a quick flash of light determines whether a target bar code media 614 is present on focal axis 602. If detector 601 indicates a possible target bar code, (and if input /LBO indicates available power) then the bar code microprocessor 609 wakes up the CCD 605 and activates light source 603 to take a reading. After taking a reading the bar code microprocessor 609 wakes up the main microprocessor 114 in the user device 120 with output signals such as "Timeout" and/or "Start Decode".

The user device microprocessor 114 decodes the bar code. If the reading is not valid, it requests another reading by supplying "Read" input to bar code microprocessor 609.

Without the second power management embodiment set forth above, user device microprocessor 114 could draw current in its sleep mode when its internal timer is on, and in proportion to the current consumed by its crystal clock. While it is possible to reduce power consumption by microprocessor 114 by running the clock at low rate, thereby saving on idle current, the result is achieved by sacrificing performance. The method of the invention solves these problems by providing an automatic 'switchless-on' mode conferred by external periodic timer 620 associated with bar code microprocessor 609. The external periodic timer 620 draws less current that the crystal clock (interval timer) in microprocessor 114, and in this manner microprocessor 114 can be put into a dormant mode while the periodic timer 620 maintains a watch for both bar code microprocessor 609 and the main microprocessor 114. With bar code microprocessor 609 and timer 620 'keeping the watch', it is possible to power down timer 113 and save still more power. (In the latter embodiment, the user device 120 may optionally be equipped with an external timer 113 that is of a "one shot design" e.g., "on" and then not on again unless re-activated, or alternatively, it is only activated as a function of bar code microprocessor 609: e.g. an external timer design capable of receiving a "Timeout" signal.) The latter embodiment provides for a dormant or sleep mode in the user—device 120 that requires very little power (i.e., idle current). As an example of the power conserved (i.e., idle current), if microprocessor 114 were running at a 10 mega-hertz rate, the subject power management embodiment is capable of saving about 75 mw or about 25%–50% of the power available.

In a third power management method according to the embodiments of the invention, the functions of bar code microprocessor 609 and microprocessor 114 are accomplished by one microcomputer (e.g., a model "68HC12" manufactured and sold by Mortorola Inc., supra), and a lower power external timer 113 (i.e, a lower power than the clock in microprocessor 114). A microprocessor such as the 68HC11 is capable of switching between a "low power/low speed" mode and "high power/high speed". In the latter "low power/low speed" mode the subject microcomputer preferably has a power consumption similar to that of bar code microprocessor 609.

Figure 6B:
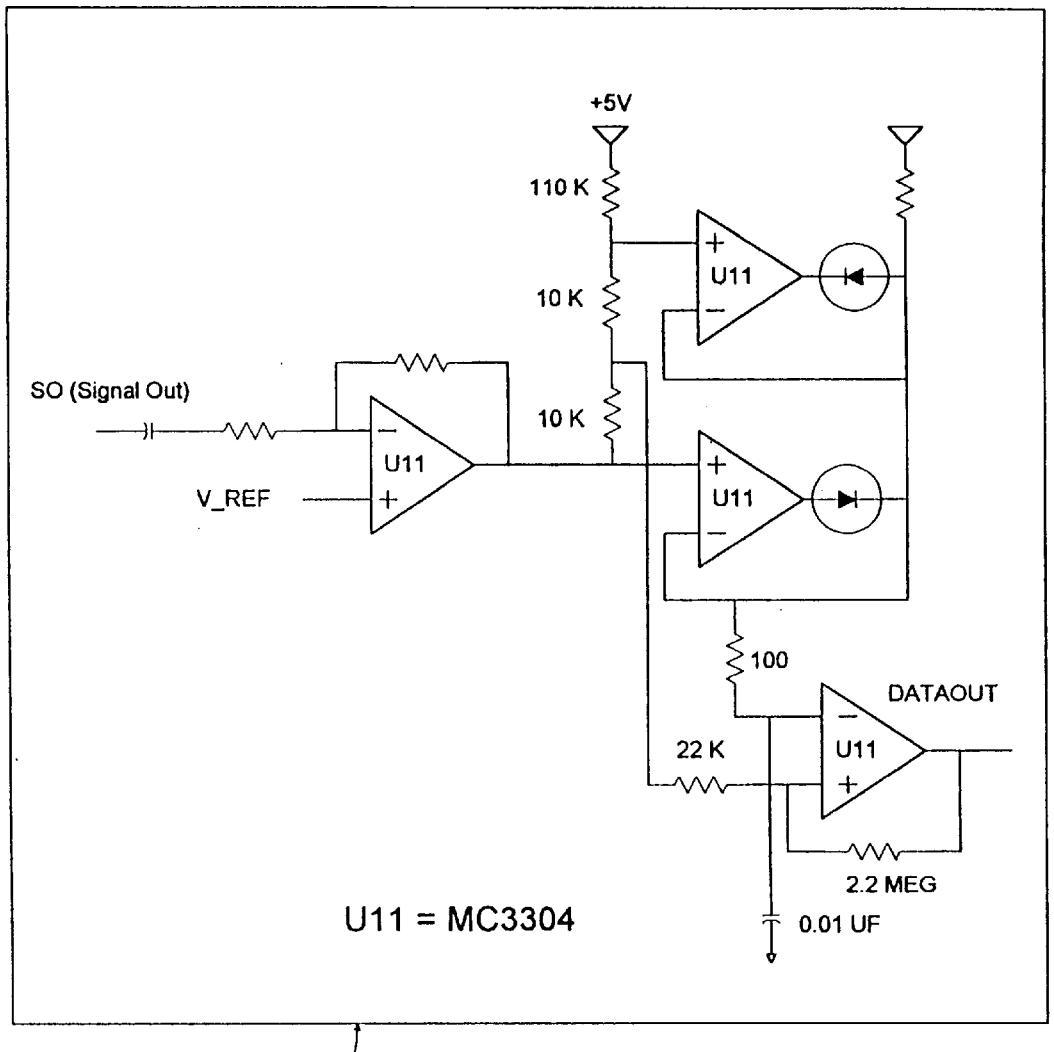

FIG. 6B depicts a signal conditioner useful for converting analog signals from a bar code reader to digital signals for input to a microprocessor in a user device.

In a representative example, and presently preferred embodiment, signal conditioner 608 is manufactured and marketed as the "MC33304P" product by Motorola Inc. (supra). The latter signal conditioner is capable of powering-down to a low power sleep mode when not in use. Signal conditioner 608 circuits convert the analog output of CCD bar code reader 605 into a digital signal transmitted as Data Out to microprocessor 114 for processing and decoding of the bar code characters.

Figure 7:
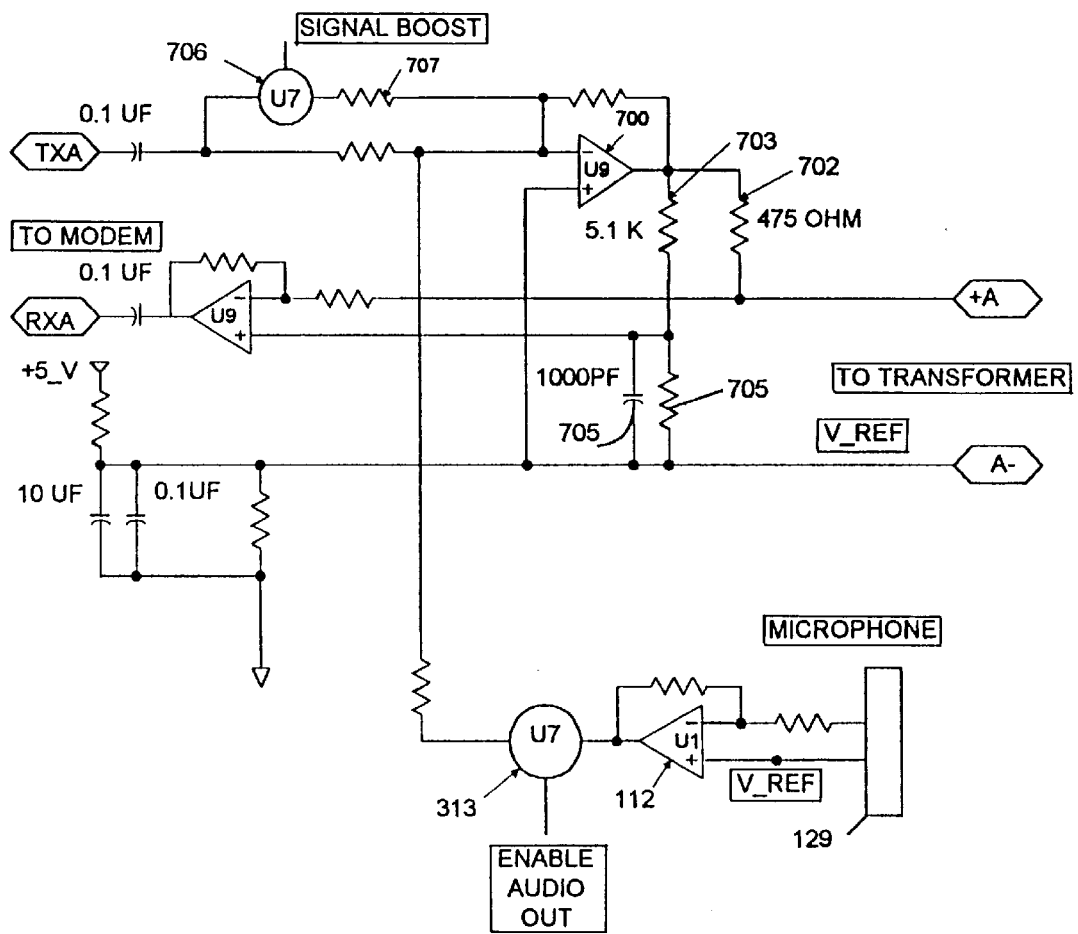
FIG. 7 depicts a modem interface circuit to a voice and data mixer in a handheld user device with dual power amplifiers.

FIG. 7 depicts an embodiment of user device 120 having a CCD type of bar code scanner.

Skilled artisans will recognize that in various optional embodiments the CCD scanner circuits of FIGS. 6A and 6B may be substituted for the bar code readers 117, 417 and 517 (supra).

Simplex and/or Full Duplex Modes of Variable Rate Telecommunication For applications in which embodiments of the invention need data transfer rates over 300 Baud, a representative example, (and presently preferred), modem is manufactured and sold as the "73K322L" unit by Silicon Systems (supra).

Silicon System's 73K322L modem (and other variable rate modems) require different external circuitry than the Motorola 300 Baud single chip modem (supra). A representative example of circuitry suitable for use with a variable rate modem, (such as the 73K322L modem), is depicted in FIG. 8.

Figure 8:
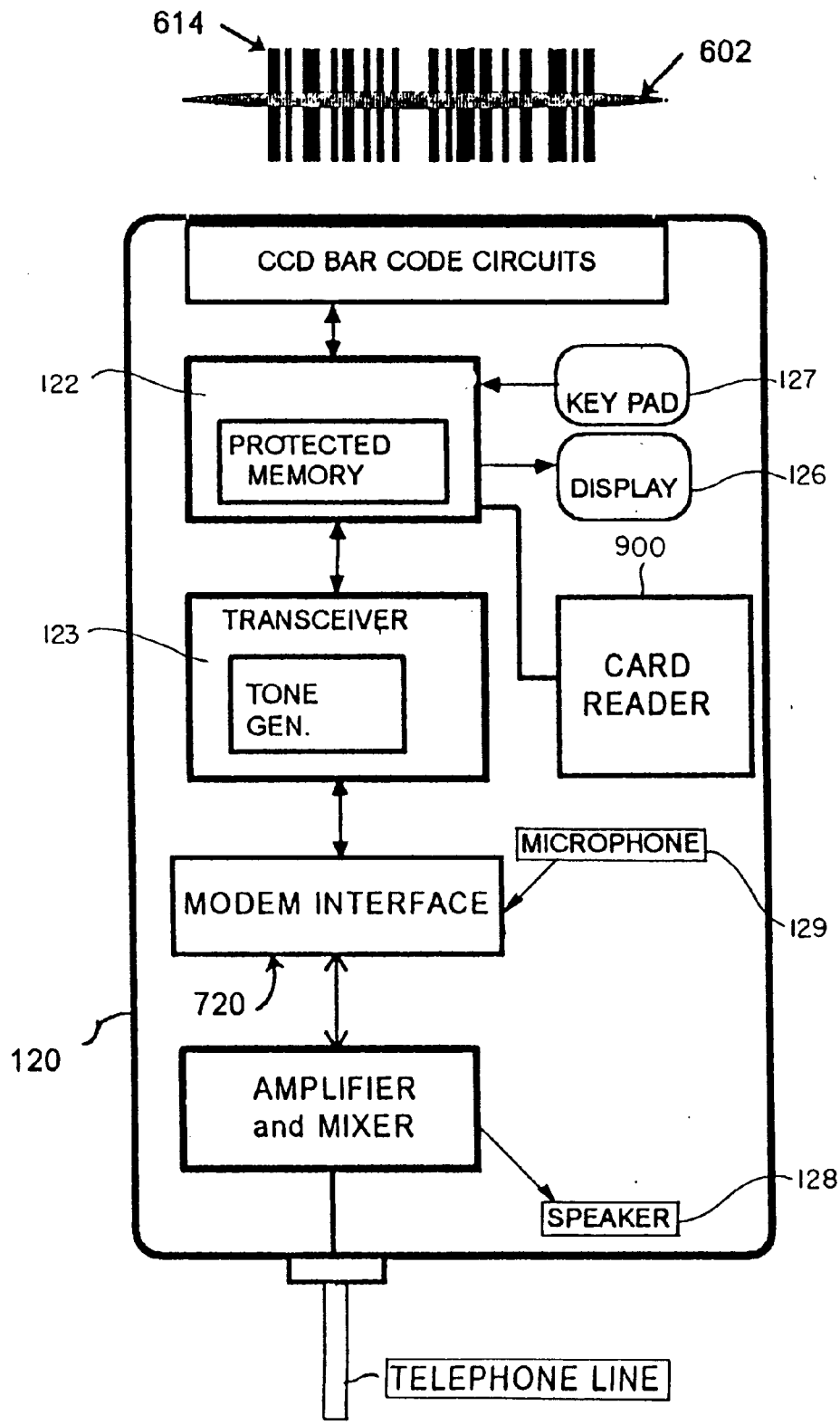
FIG. 8 depicts a user device having a CCD type bar code reader.

FIG. 8 depicts a modem interface circuit useful for matching a variable rate modem with the power management methods of the low power handheld user device.

Amplifiers 700 and 701 interface modem RXA and TXA signals to telephone transformer 210. The circuitry (FIG. 8) is capable of simplex data transfers (one direction at a time) and full duplex (simultaneous sending and receiving of data).

During full duplex data transfers, there is a transmit tone pair and a receive tone pair. Filters are used to keep the send and receive tones from interfering with each other.

Amplifier 701 amplifies the signals received on the telephone line and sends these signals to the RXA input of the modem. During full duplex operations transmit and receive tones are both sent to the RAA input of the modem. The modem filters out its own transmit signals in order to receive data correctly.

Resistors 703 and 704 with capacitor 705 form a feedback path to cancel out most of the modem's own transmit signal before they reaches the modem input RAA. The modems internal filters remove any residual transmit signals received at RXA.

The values of resistors 703 and 704 are adjusted to minimize the strength of the transmit signal received at RXA. The resistors should preferably be adjusted with production circuit cards. (Transformer 210 is preferably connected to a 600 ohm load to simulate a telephone line when adjusting the values for resistors 703 and 704.)

Analog switch 706 and resistor 707 are used to boost the strength of DTMF signals.

Embodiments of the invention (disclosed above) provide a lightweight handheld low power user device 100 that is capable of sending command message with audio content to a host server. In accommodating a variable rate bidirectional modem to use in certain embodiments of the invention, the audio input circuitry of the user device (FIG. 3, supra) may be affected by amplifiers 701 and 702. In that event the following modifications are presently preferred: namely, (i) user device microphone 129, amplifier 112 (FIG. 1), and analog switch 313 (FIG. 3) are connected to provide input for amplifier 700 (FIG. 8), and (ii) amplifier 700 drives the voice communications by the operator over the telephone line. In the latter case, amplifiers 701 and 702 and transformer 210 form a hybrid telephone interface circuit that has a built in sleep mode. (The subject circuit—FIG. 8—is different from those in common use which do not incorporate a sleep mode of operation.) In a representative example, (and presently preferred embodiment), amplifier 701/702 having a "self-activating" sleep mode capability is available as the Motorola "MC33304P" amplifier. The subject hybrid circuit maintains a low power sleep mode unless it is needed to amplifying signals.

Power Management

User device 100 contains multiple component circuits that all share a limited power source. Uncontrolled use of any single component circuit may break the budget of less than 300 mw, particularly the transceiver 115 circuits which may draw more than half of the total allowable current. In a presently preferred embodiment, user device 100 includes a power supply circuit that monitors the power stored in a capacitor or battery. An /LBO ("low battery out") instruction indicates to microprocessor 114 that the storage element is nearly completely charged. Microprocessor 114 conducts an /LBO check before enabling circuitry which draws significant amounts of power, e.g., a codec, a modem or the audio system. Microprocessor 114 also conducts an /LBO check before enabling circuits that may draw a significant amount of power (e.g., a modem unit amount or bar code reader unit amount). Microprocessor 114 also conducts an /LBO check before enabling circuits needed for any data transmission. If an /LBO check indicates that insufficient power exists for a data transfer, the user device 100 turns off all non-essential circuitry and waits for the storage power circuit to charge. Telecommunication lines provide maximum loop line currents when the line is silent, i.e., without voice communication. To facilitate charging, user device 100 may send a command message (e.g., a DTMF or MF switch signal) to the host server to "turn off voice communications and wait". The latter command message facilitates re-charging of user device 100. User device 100 can periodically "report" to the host server the status of power circuits, and the application running in host server can make its own determination of whether to signal an informational "time out" message, e.g., 'call back later' to the screen display. If the power condition is acceptable to microprocessor 114 it provides current to "wake up" transceiver 115. A protocol ID tone (e.g., a selected pre-programmed DTMF or MF tone) is then sent to the host server indicating a status ready to send command messages and receive informational messages. The protocol ID tone (i.e. switch signal) can be issued in less than about 0.1 seconds, i.e., a time significantly faster than the time required for negotiations (supra).

Capacitor 220 is used to store power. Capacitor 220 provides power to the User device 100 when the telephones lines do not provide enough power. Telephone lines provide the most power, when the telephone line is silent. The power is limited when either sides sends audio or data signals. The capacitor 220 stores enough power to run the user device 100 during loud or long voice or data messages.

The voltage level of capacitor 220 is monitored at voltage regulator 221. The /LBO output of regulator 221 is high when capacitor 220 is almost fully charged. The microprocessor 114 checks the status of /LBO at capacitor 220 before starting a function that requires a significant amount of power. /LBO is checked before all modem data transfers and bar code scans.

The User Device Answers the Phone

Embodiments of the invention provide a user device 100 capable, in certain optional aspects, of answering a telephone call while on-hook and even when drawing power from the telephone line. Common telephone transceiver units cannot draw power to run circuits while "on hook". In a first representative use, user device 100 is capable of answering the phone so that the host server may leave a message for the user. In a second representative use, the host server may use this feature of user device 100 for performing a maintenance or security session. The subject user—device 100 is capable of listening for a ring (supra) and using the power of the "ring signal" to turn on relay coil 214 (FIG. 2). The relay then answers the "ring" by powering up the user device 100, i.e., microprocessor 114. The ring signal is feed to relay coil 214 by resistor 214 and capacitor 220. In this particular embodiment, capacitor 220 is rated for high voltage and very low leakage. Zener Diode 215 and capacitor 216 protect the coil from the very high voltage ring signal.

PROM Security Provisions

Figure 9:
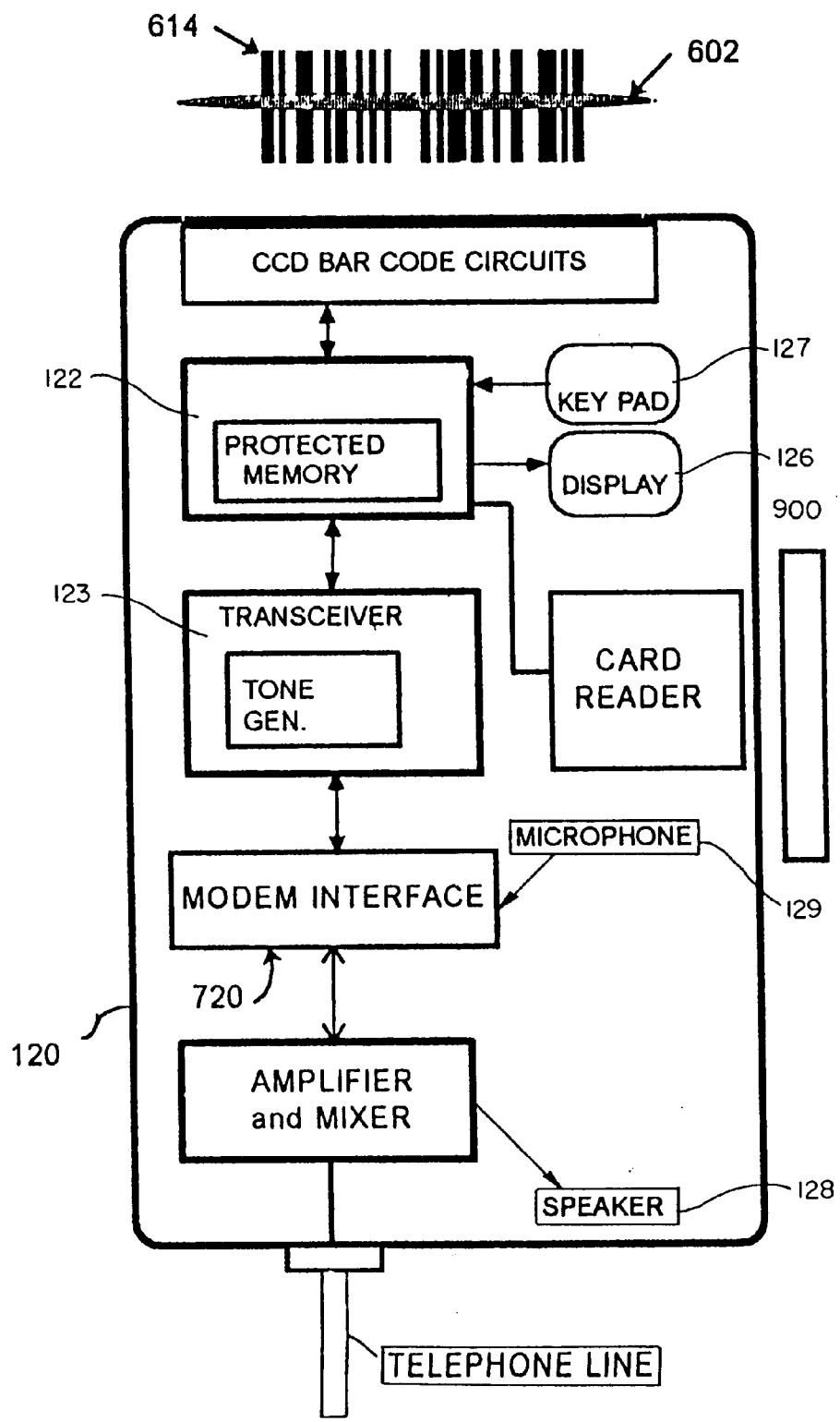
FIG. 9 depicts a user device having a CCD type bar code reader and a magnetic card reader.
Figure 10:
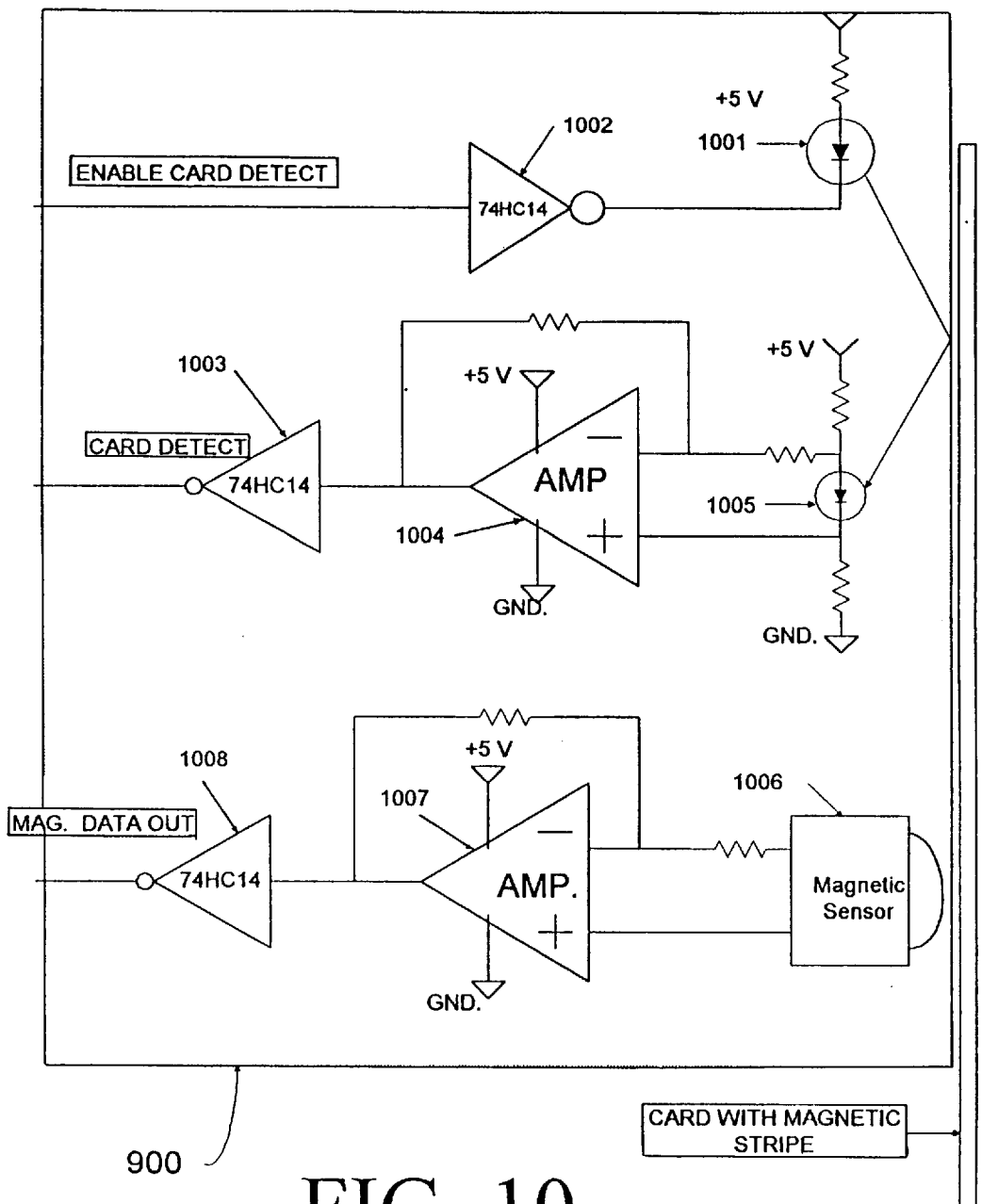
FIG. 10 depicts a magnetic card reader interface circuit useful in a low power handheld user device according to the instant disclosure (below).

Protected non-volatile memory in microprocessor 114 is an integral part of security systems provided by embodiments of the invention. Protected memory is not accessible to thieves. Unauthorized attempts to read it result in erasure. The protected memory in user device 100 contains one or more of the following: namely, credit card numbers; spending limits; passwords; encryption parameters; sequence number (i.e., for sessions, supra); telephone access numbers to different hosts servers for different goods and services; encryption seed; user ID and account numbers; user mailing and shipping information; user FAX telephone number; and, a preferred vendor identification code. Referring to FIG. 9, an operator enters credit/debit card information into protected memory e.g. at keypad 127 or magnetic card reader 900 (FIG. 9). The subject information is used to make financial transactions between the operator and vendors using a host server. User sensitive information (e.g., the subject credit/debit card information) is transmitted from the user device to the host server in an encrypted format. Critical parameters of the encryption algorithm are stored in protected memory. Sequence numbers (i.e., from session logs) are also stored in protected memory and represent one level of security against unauthorized access. (Uses of sequence numbers in security methods are disclosed by one of the inventors in U.S. application Ser. No. 08/480,614, filed Jun. 7, 1995 and incorporated herein by reference.)

The encryption code used in financial (and other encrypted) transactions employs and "encryption seed" (i.e., a set of encryption parameters) stored in protected memory. Using a different "seed" for each session represents a second level of security against unauthorized access, that makes it more difficult for thieves to decode the contents of a transmission.

Including the mailing address for an account holder (i.e., user mailing address above; FIG. 9) represents a third level of security against unauthorized use since any products ordered by a thief would be delivered to the account holder's mailing address.

A "preferred vendor" may be identified by an operator, or by an account holder, or the selection of the vendor may be determined by the host server based upon the products ordered by an operator.

The user device 100 performs the functions of a "smart card" (defined above, supra), by allowing an operator to make purchases on line. Unlike a "smart card: the user device of the invention (and protected memory) provides clone detection to protect the account holder against unauthorized use.

While the preferred embodiment of the invention in various aspects has been illustrated and described, it will be appreciated that various changes and modifications of components can be made therein without departing from the spirit and scope of the invention.

We claim:

1. A handheld low power user device for accessing and controlling interactive bidirectional real time voice and data telecommunications with a host server over a telecommunication path, said handheld low power user device comprising a communication transceiver, a microprocessor, a power supply interface and an operator interface selected from among a keypad, a bar code reader, an audio system comprising a speaker, a display screen and a microphone, wherein the communication transceiver comprises a low power sleep mode, a voice and data modem, and a DTMF or an MF tone generator, and wherein said communication transceiver is connected to and in communication with a component selected from among the telecommunication path, the microprocessor and the audio system;

wherein said audio system comprises a dual power audio system having a low power sleep mode;

wherein said bar code reader comprises a low power bar code reader having a low power sleep mode and a low power means for detecting proximity of a bar code media;

wherein said microprocessor comprises a program read only memory, a protected memory and a random access memory, and wherein said microprocessor is connected to and in communication with the transceiver and an operator interface selected from among the bar code reader and the display screen;

wherein the power supply interface is connected to the microprocessor and supplies less than about 300 milliwatts of power to operate said handheld low power user device when off hook.

2. The low power handheld user device of claim 1, wherein the power supply interface is connected to a power supply selected from among a telephone loop line current, a PBX telephone line, a cellular telephone battery, or a wireless telephone battery.

3. The handheld low power user device of claim 1, wherein the telecommunication path comprises a wire, a coaxial cable, an optical cable, a microwave telecommunication channel, a satellite telecommunication channel, wired, wireless or cordless telephone.

4. The handheld low power user device of claim 1, wherein the microprocessor program read only memory has means for determining a power supply status at the power supply interface and if the power supply status is low maintaining any of the communication transceiver, the audio system, the screen display or the bar code reader in the sleep mode.

5. The handheld low power user device of claim 1, wherein the microprocessor program read only memory has means for determining a voice communication mode or a data communication mode on the telecommunication path and a means for maintaining in the sleep mode one or more of a plurality of amplifiers in the audio system, the transceiver, the bar code reader and the microprocessor.

6. The handheld low power user device of claim 5, further comprising a means for awakening the microprocessor, said means comprising an input signal selected from among an interrupt signal from a low power interval timer, a keypad keystroke, a logic signal from the bar code reader, and a white state proximity detection signal from the bar code reader.

7. The handheld low power user device of claim 6, further comprising a means for determining a status for occurrence of the input signal, wherein if said status is negative the microprocessor returns to the sleep mode and wherein if said status is positive the microprocessor awakens and supplies power to one or more of the bar code reader, the transceiver, or the audio system.

8. The handheld low power user device of claim 6, wherein tie interval timer comprises a timer selected from among a microprocessor internal timer, an external timer, a CCD bar code reader microprocessor.

9. The handheld low power user device of claim 1, wherein said microprocessor is capable of encoding a command message to said host server, said host server is capable of receiving said command message and encoding and transmitting in response thereto an information message to said low power handheld user device, and wherein said communication transceiver is capable of transmitting said command messages and receiving said information messages.

10. The handheld low power user device of claim 1, wherein the bar code reader further comprises a bar code reader microprocessor.

11. The handheld low power user device of claim 9, wherein said telecommunication transceiver further comprises a call progress tone detector and a voice processing element.

12. The handheld low power user device of claim 1, wherein the protected memory comprises one or more of a credit or a debit card number, a financial account number, an encryption parameter, a spending limit, a password, a sequence number; a telephone access number, an encryption seed, a user identification number, an account number, and a postal address.

13. The handheld low power user device of claim 9, wherein said command message comprise a telecommunication signal selected from among a modem data signal, an encoded bar code signal, a DTMF signal, an MF signal, a voice communication signal and an encoded keystroke signal.

14. The handheld low power user device of claim 1, wherein said a bar code reader is selected from among a low power CCD bar code reader and a single point bar code reader.

15. The handheld low power user device of claim 14, wherein said CCD bar code reader further comprises a proximity detector means.

16. A low power bar code reader having a low power sleep mode, and said bar code reader comprising: a power supply interface; an interface to a central processing unit; a proximity detection means; a bar code reading means; a microprocessor having a program read only memory capable of processing bar code readings, determining a power level at a power supply interface, and maintaining the bar code reading means in the low power sleep mode when the power level at the power supply interface is low; and wherein the power level at the power supply interface comprises less than about 300 milliwatts.

17. The low power bar code reader of claim 16, further comprising a timer selected from among an internal timer and an external timer, wherein said timer is connected to a microprocessor having means for awakening the bar code reader from the sleep mode and for instructing the bar code reader to determine a proximity of a bar code media.

18. The low power bar code reader of claim 17, further comprising a CCD bar code reader comprising a proximity detector having a target light and a photosensitive diode for detecting a light reflected from a target bar code media.

19. A voice and data modem having a low power sleep mode, said voice and data modem capable of transmitting and receiving telecommunication signals while operating on less than about 300 milliwatts of power.

20. A microprocessor having a low power sleep mode, said microprocessor comprising a first means for determining a power level at a power supply interface; a second means for maintaining in a sleep mode a bar code reader, a transceiver and an audio system; a third means for digital processing of a keypad keystroke entry, a bar code data signal, and a digital voice signal; and a fourth means for operating to achieve all of said first, second and third means on less than about 300 milliwatts of power.

21. A telecommerce system comprising a handheld low power user device for accessing and controlling interactive bidirectional real time voice and data telecommunications with a host server at a financial institution over a telecommunication path, said handheld low power user device comprising a communication h microprocessor, a power supply interface and an operator interface selected from among a keypad, a bar code reader, a display screen and an audio system comprising a speaker and a microphone, wherein the communication transceiver comprises a low power sleep mode, a modem, and a DTMF or an MF tone generator, and wherein said communication transceiver is connected to and in communication with a component selected from among the telecommunication path, the microprocessor and the audio system;

wherein said audio system comprises a dual power audio system having a low power sleep mode;

wherein said bar code reader comprises a low power bar code reader having a low power sleep mode and a low power means for detecting proximity of a bar code media;

wherein said microprocessor comprises a program read only memory, a protected memory and a random access memory, and wherein said microprocessor is connected to and in communication with the transceiver and an operator interface selected from among the bar code reader and the display screen;

wherein the protected memory comprises one or more of a credit or a debit card number, a financial account number, an encryption parameter, a spending limit, a password, a sequence number; a telephone access number, an encryption seed, a user identification number, an account number, and a postal address; and wherein the power supply interface is connected to the microprocessor and supplies less than about 300 milliwatts of power to operate said handheld low power user device.

22. The system of claim 21, further comprising a plurality of command instructions in the microprocessor for conducting a session with the host server.

23. The system of claim 22, wherein the session conducted with the host server comprises one ore more steps for ordering a consumer product or service.

24. A handheld low power user device for answering a telephone call, comprising a communication transceiver drawing less than about 10 nanoamps of current when in an off hook mode, a microprocessor, an telecommunications interface to a telecommunication path, a power supply interface, an on hook relay coil, a storage capacitor, and an operator interface selected from among a keypad, a bar code reader, an audio system comprising a speaker, a display screen and a microphone, wherein the communication transceiver comprises a low power sleep mode and a low power voice and data modem, and wherein said communication transceiver is connected to and in communication with a component selected from among the telecommunication path, the microprocessor and the audio system;

wherein said audio system comprises a dual power audio system having a low power sleep mode;

wherein said bar code reader comprises a low power bar code reader having a low power sleep mode and a low power means for detecting proximity of a bar code media;

wherein said microprocessor comprises a program read only memory, a protected memory and a random access memory, and wherein said microprocessor is connected to and in communication with the transceiver and an operator interface selected from among the bar code reader and the display screen;

wherein the user device has a first means for listening for a ring signal on the telecommunications path; a second means for using a ring power in the ring signal to turn on the relay coil; a third means for feeding the ring signal power to the storage capacitor thereby to provide a power supply for the user device at the power supply interface; a fourth means for activating said microprocessor after said storage capacitor reaches a specified voltage level; and wherein the power supply interface is connected to the microprocessor and supplies less than about 300 milliwatts of power to operate said handheld low power user device.

25. The low power handheld user device of claim 22, wherein the power supply interface is connected to a power supply selected from among a telephone loop line current and, PBX telephone line, a cellular telephone battery, or a wireless telephone battery.

26. The handheld low power user device of claim 22, wherein the telecommunication path comprises a wire, a coaxial cable, an optical cable, a microwave telecommunication channel, a satellite telecommunication channel, wired, wireless or cordless telephone.

* * * * *